(12) United States Patent
Hamada et al.

(10) Patent No.: US 10,000,187 B2
(45) Date of Patent: Jun. 19, 2018

(54) VEHICLE COMMUNICATION SYSTEM, IN-VEHICLE DEVICE, PORTABLE DEVICE, AND COMPUTER PROGRAM

(71) Applicants: AutoNetworks Technologies, Ltd., Yokkaichi-shi, Mie (JP); Sumitomo Wiring Systems, Ltd., Yokkaichi-shi, Mie (JP); Sumitomo Electric Industries, Ltd., Osaka-shi, Osaka (JP)

(72) Inventors: Yoshihiro Hamada, Osaka (JP); Hiroyuki Kurata, Yokkaichi (JP)

(73) Assignees: Sumitomo Wiring Systems, Ltd., Yokkaichi-shi, Mie (JP); AutoNetworks Technologies, Ltd., Yokkaichi-shi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days. days.

(21) Appl. No.: 15/320,809

(22) PCT Filed: Jun. 22, 2015

(86) PCT No.: PCT/JP2015/067832
§ 371 (c)(1),
(2) Date: Dec. 21, 2016

(87) PCT Pub. No.: WO2015/199010
PCT Pub. Date: Dec. 30, 2015

(65) Prior Publication Data
US 2017/0136992 A1    May 18, 2017

(30) Foreign Application Priority Data
Jun. 26, 2014 (JP) .................................. 2014-131685

(51) Int. Cl.
*B60R 25/24* (2013.01)

(52) U.S. Cl.
CPC .................................. *B60R 25/245* (2013.01)

(58) Field of Classification Search
CPC ........................... B60R 25/245; G03G 21/007
(Continued)

(56) References Cited

U.S. PATENT DOCUMENTS

2005/0046568 A1    3/2005  Tanaka
2007/0109093 A1*   5/2007  Matsubara ......... G07C 9/00309
                                                       340/5.61
(Continued)

FOREIGN PATENT DOCUMENTS

JP    2007-132139 A    5/2007
JP       4483236 B2    6/2010
(Continued)

OTHER PUBLICATIONS

Japanese Patent Application Laid-Open No. 2010-139986. Laid-open date Sep. 2, 2010. Corresponds to US 2007/0109093.
(Continued)

*Primary Examiner* — Hirdepal Singh
(74) *Attorney, Agent, or Firm* — Honigman Miller Schwartz and Cohn LLP

(57) ABSTRACT

In the vehicle communication system provided with the in-vehicle device for transmitting and receiving signals using the plurality of antennas, which are provided in different positions in the vehicle, and the portable device for transmitting and receiving the signals, the in-vehicle device: stores statistical values derived by measuring in advance received signal strengths of signals transmitted from a part of the plurality of antennas in association with information identifying antennas of transmission sources, for each of the inside and the outside of a vehicle cabin of measured positions; detects an antenna having a failure; calculates, for inside and outside the vehicle cabin, the statistical distance
(Continued)

between the measured received signal strength and the statistical values corresponding to the selected antennas; makes a comparison between the results of the calculation; and determines whether the portable device is inside or outside the vehicle cabin.

7 Claims, 30 Drawing Sheets

(58) Field of Classification Search
USPC .......................................................... 340/5.61
See application file for complete search history.

(56) References Cited

U.S. PATENT DOCUMENTS

| | | | |
|---|---|---|---|
| 2007/0188301 A1 | 8/2007 | Nakajima et al. | |
| 2008/0204332 A1* | 8/2008 | Ikeura | H01Q 1/3241 343/703 |
| 2012/0244877 A1* | 9/2012 | Margalef | G01S 5/0252 455/456.1 |
| 2014/0253287 A1* | 9/2014 | Bauman | G07C 9/00309 340/5.61 |
| 2014/0320262 A1* | 10/2014 | Park | G07C 9/00111 340/5.61 |
| 2015/0170444 A1* | 6/2015 | Yasui | G07C 9/00007 340/5.61 |
| 2015/0321643 A1* | 11/2015 | Nowottnick | B60R 25/245 340/5.6 |
| 2016/0205498 A1* | 7/2016 | Takigawa | B60R 25/245 455/41.2 |
| 2016/0371906 A1* | 12/2016 | Fujiyama | B60R 25/245 |

FOREIGN PATENT DOCUMENTS

| | | | |
|---|---|---|---|
| JP | 2010-189986 A | | 9/2010 |
| JP | 2010189986 A | * | 9/2010 |
| JP | 4373230 B2 | | 4/2011 |
| JP | 5165618 B2 | | 3/2013 |

OTHER PUBLICATIONS

Japanese Patent Application Laid-Open No. 2007-132139. Laid-open date May 31, 2007.
English Translation of International Search Report of PCT/JP2015/067832.
PCT/IPEA/409 of PCT/JP2015/067832.

* cited by examiner

TYPE 3

TYPE 4

FIG. 14

| IDENTIFICATION INFORMATION | TYPE 1 | TYPE 2 | TYPE 3 | TYPE 4 | TYPE 5 | TYPE 6 |
|---|---|---|---|---|---|---|
| ANTENNA | 1, 2 | 2, 3, 4 | 1, 3, 4 | 3, 4 | 1, 2, 3 | 1, 2, 4 |
| PRIORITY LEVEL | 3 | 1 | 2 | 4 | 5 | 6 |

F I G. 1 5

| IDENTIFICATION INFORMATION | TYPE 1 | TYPE 2 | TYPE 3 | TYPE 4 | TYPE 5 | TYPE 6 |
|---|---|---|---|---|---|---|
| ANTENNA | 1, 2 | 2, 3, 4 | 1, 3, 4 | 3, 4 | 1, 2, 3 | 1, 2, 4 |
| PRIORITY LEVEL OF THE FIRST AREA | 2 | 1 | 5 | 6 | 2 | 2 |
| PRIORITY LEVEL OF THE SECOND AREA | 2 | 5 | 1 | 6 | 2 | 2 |
| PRIORITY LEVEL OF THE THIRD AREA | 6 | 3 | 3 | 2 | 1 | 3 |

FIG. 17

| IDENTIFICATION INFORMATION | TYPE 1 | TYPE 2 | TYPE 3 | TYPE 4 | TYPE 5 | TYPE 6 |
|---|---|---|---|---|---|---|
| ANTENNA | 1, 2 | 2, 3, 4 | 1, 3, 4 | 3, 4 | 1, 2, 3 | 1, 2, 4 |
| PRIORITY LEVEL OF THE FIRST AREA | 2 | ①  | 5 | 6 | 2 | 2 |
| PRIORITY LEVEL OF THE SECOND AREA | 2 | ⑤ | 1 | 6 | 2 | 2 |
| PRIORITY LEVEL OF THE THIRD AREA | 6 | 3 | 3 | ② | 1 | 3 |

F I G. 1 8

| IDENTIFICATION INFORMATION | TYPE 1 | TYPE 2 | TYPE 3 | TYPE 4 | TYPE 5 | TYPE 6 |
|---|---|---|---|---|---|---|
| ANTENNA | 1, 2 | 2, 3, 4 | 1, 3, 4 | 3, 4 | 1, 2, 3 | 1, 2, 4 |
| PRIORITY LEVEL OF THE FIRST AREA | 2 | 1 | ⑤ | 6 | 2 | 2 |
| PRIORITY LEVEL OF THE SECOND AREA | 2 | 5 | ① | 6 | 2 | 2 |
| PRIORITY LEVEL OF THE THIRD AREA | 6 | 3 | 3 | ② | 1 | 3 |

F I G. 19

| IDENTIFICATION INFORMATION | TYPE 1 | TYPE 2 | TYPE 3 | TYPE 4 | TYPE 5 | TYPE 6 |
|---|---|---|---|---|---|---|
| ANTENNA | 1, 2 | 2, 3, 4 | 1, 3, 4 | 3, 4 | 1, 2, 3 | 1, 2, 4 |
| PRIORITY LEVEL OF THE FIRST AREA | ②  | 1 | 5 | 6 | 2 | 2 |
| PRIORITY LEVEL OF THE SECOND AREA | ② | 5 | 1 | 6 | 2 | 2 |
| PRIORITY LEVEL OF THE THIRD AREA | 6 | 3 | 3 | 2 | 1 | ③ |

F I G. 2 0

| IDENTIFICATION INFORMATION | TYPE 1 | TYPE 2 | TYPE 3 | TYPE 4 | TYPE 5 | TYPE 6 |
|---|---|---|---|---|---|---|
| ANTENNA | 1, 2 | 2, 3, 4 | 1, 3, 4 | 3, 4 | 1, 2, 3 | 1, 2, 4 |
| PRIORITY LEVEL OF THE FIRST AREA | ②  | 1 | 5 | 6 | 2 | 2 |
| PRIORITY LEVEL OF THE SECOND AREA | ② | 5 | 1 | 6 | 2 | 2 |
| PRIORITY LEVEL OF THE THIRD AREA | 6 | 3 | 3 | 2 | ① | 3 |

VEHICLE COMMUNICATION SYSTEM, IN-VEHICLE DEVICE, PORTABLE DEVICE, AND COMPUTER PROGRAM

CROSS-REFERENCE TO RELATED APPLICATIONS

This application is the national phase under 35 U. S. C. § 371 of PCT International Application No. PCT/JP2015/067832 which has an International filing date of Jun. 22, 2015 and designated the United States of America.

FIELD

The present application relates to a vehicle communication system, an in-vehicle device and a portable device configuring the vehicle communication system, and a computer program.

BACKGROUND

Vehicle communication systems locking and unlocking vehicle doors without using mechanical keys are practically used. More specifically, a keyless entry system locking and unlocking vehicle doors through a remote operation from a portable device held by a user, a smart entry (registered trademark) system unlocking vehicle doors when a user holding a portable device approaches a vehicle or is in contact with only a door handle, and the like are practically used.

In addition, a vehicle communication system enabling an engine or a driving battery system of a vehicle to be started without using a mechanical key (ignition key) is practically used as well. More specifically, a system called a push start system or the like in which an engine or a driving battery system is started by a user, who holds a portable device, only pushing a start button is practically used. In such a push start system, an in-vehicle device configuring a vehicle communication system performs a vehicle cabin inside or outside determining process determining whether or not an authorized portable device corresponding to a vehicle is located inside a vehicle cabin. In the push start system, only in a case where an authorized portable device is determined to be located inside the vehicle cabin, the engine or the driving battery system is started, thereby improving the convenience and the safety.

In the vehicle cabin inside or outside determining process, a position estimating technology using transmission and reception of radio signals between the in-vehicle device and the portable device is used. The position estimating technology using transmission and reception of radio signals is largely divided into a range-based system and a range-free system. The range-based system is a method in which, in the vehicle cabin inside or outside determining process, special information relating to a radio signal that is transmitted and received between a plurality of on-vehicle antennas disposed at different positions in a vehicle and a portable device, for example, a received signal strength indication (RSSI), a time of arrival (TOA), a time difference of arrival (TDOA), an angle of arrival (AOA), or the like of a radio signal is measured by the in-vehicle device or the portable device, and the position of the portable device is estimated based on a difference between measurement results. In contrast to this, the range-free system is a method in which, in the vehicle cabin inside or outside determining process, based on the presence or absence of a response signal for a detection signal between an on-vehicle antenna of which the position is known and the portable device, a relative position (presence/absence) is estimated in the in-vehicle device or the portable device.

In Japanese Patent No. 4483236, a keyless entry device is disclosed which respectively transmits signals from antennas disposed inside and outside the vehicle cabin and determines whether the position of the portable device is inside or outside the vehicle cabin based on whether or not a portable device responds to a signal transmitted from a certain antenna. In other words, for a vehicle cabin inside/outside determination disclosed in Japanese Patent No. 4483236, the range-free system performing a determination based on only the presence/absence of a response from the portable device for a signal transmitted from the in-vehicle device side is employed.

In Japanese Patent No. 4673230, an invention relating to a keyless entry device performing a boundary surface inside or outside determination such as the inside or outside of the vehicle cabin of the portable device, within or beyond a predetermined distance from a door, or the like is disclosed. In Japanese Patent No. 4673230, a method of determining the inside or outside of a boundary surface using the range-based system is disclosed in which the inside or outside determination is performed by measuring a received signal strength of a signal transmitted from an on-vehicle antenna on the portable device side. Particularly, in Japanese Patent No. 4673230, it is disclosed that the boundary surface inside or outside determination is performed with high accuracy also in case where an on-vehicle antenna is configured to be attached to a movable member such as a door mirror, a sheet, or a handle. More specifically, it is disclosed that a degree of similarity with a data group and a parameter in that electric wave strengths that are different inside and outside the boundary surface obtained in advance and an identification code of the on-vehicle antenna are associated with each other, and the degree is derived by calculating a Mahalanobis distance, and the data group and the parameter that are comparison targets are switched in accordance with states before and after the movement of the movable member.

In U.S. Pat. No. 5,165,618, an invention relating to a keyless entry device associated with the invention disclosed in Japanese Patent No. 4673230 is disclosed. In Japanese Patent No. 5165618, particularly, it is disclosed that the calculation is performed using the electric wave strength from an on-vehicle antenna that has failed as zero for deriving the degree of similarity by calculating a Mahalanobis distance between a measured electric wave strength and electric wave strengths obtained in advance which are different inside and outside the boundary surface, even if the on-vehicle antenna has failed, so that the accuracy of the determination of the position of the portable device is maintained as possibly as can.

SUMMARY

In the determination of the portable device to be inside/outside the vehicle cabin using the range-free system as disclosed in Japanese Patent No. 4483236, it is difficult to perform a determination having high accuracy.

In Japanese Patent No. 4673230, while a determination having high accuracy using the range-based system based on a received signal strength can be performed, a change in the received signal strength of a case where some on-vehicle antennas have failed is not considered.

According to the invention disclosed in Japanese Patent No. 5165618, in a case a failure occurs in an on-vehicle antenna, the on-vehicle antenna that has failed is not used, whereby the determination accuracy can be maintained. However, since the positions of on-vehicle antennas are designed to be appropriately arranged on the front, rear, left and right of the vehicle in consideration of using all the antennas, the calculation using the received signal strengths of signals transmitted from all the remaining antennas expect for the antenna that has failed, may degrade the determination accuracy.

An object is to provide a vehicle communication system capable of determining whether a portable device is located inside or outside a vehicle cabin with high accuracy in a case where some of on-vehicle antennas have failed, and an in-vehicle device and a portable device configuring the vehicle communication system, and a computer program.

A vehicle communication system according to one embodiment of the present disclosure, comprises: an in-vehicle device transmitting and receiving signals by using a plurality of antennas disposed at different positions of a vehicle; and a portable device receiving signals transmitted from one or more of the plurality of antennas and transmitting signals in response to the received signals, wherein the in-vehicle device comprises: a storage part storing statistical values derived by measuring in advance received signal strengths of signals transmitted from a part of the plurality of antennas in association with information identifying antennas of transmission sources, for each of the inside and the outside of a vehicle cabin of measured positions; a failure detection part detecting an antenna having failed among the plurality of antennas; a selection part selecting antennas for use from remaining antennas of the plurality of antennas except for the antenna having failed detected by the failure detection part; a reading part reading statistical values corresponding to the selected antennas from the storage part; and a determination part determining whether the portable device is located inside or outside the vehicle cabin of the vehicle by calculating and comparing statistical distances between the statistical values read by the reading part and received signal strengths of signals measured by the portable device, the signals being transmitted from the selected antennas selected by the selection part, for each of the inside and the outside of the vehicle cabin.

An in-vehicle device according to one embodiment of the present disclosure, transmitting a signal to another device by using a plurality of antennas disposed at different positions of a vehicle and receiving a signal from said another device, comprises: a storage part storing statistical values derived by measuring in advance received signal strengths of signals transmitted from a part of the plurality of antennas in association with information identifying antennas of transmission sources, for each of the inside and the outside of a vehicle cabin of measured positions; a failure detection part detecting an antenna having failed among the plurality of antennas; a selection part that selecting antennas for use from remaining antennas of the plurality of antennas except for the antenna having failed detected by the failure detection part; a reading part reading statistical values corresponding to the selected antennas from the storage part; and a determination part determining whether said another device is located inside or outside the vehicle cabin of the vehicle by calculating and comparing statistical distances between the statistical values read by the reading part and a measure result of received signal strengths received from said another device for each of the inside and the outside of the vehicle cabin.

A portable device according to one embodiment of the present disclosure, receiving a signal transmitted from a plurality of antennas disposed at different positions of a vehicle and transmitting a signal in response to the received signals, comprises: a storage part storing statistical values derived by measuring in advance received signal strengths of signals at positions inside and outside a vehicle cabin, the signals being transmitted from the plurality of antennas, in association with information identifying antennas of transmission sources, for each of the inside and the outside of a vehicle cabin of measured positions; a notification receiving part receiving a notification of antennas for use among the plurality of antennas; a reading part reading the statistical values for each of the inside and the outside of the vehicle cabin, from the storage part, relating to received signal strengths of signals transmitted from the antennas for use identified by the notification received by the notification receiving part; a measurement part measuring the received signal strengths of the signals transmitted from the antennas for use; and a determination part determining whether the portable device is located inside or outside the vehicle cabin of the vehicle by calculating and comparing statistical distances between the statistical values read by the reading part and the received signal strengths measured by the measurement part, for each of the inside and the outside of the vehicle cabin.

A computer program according to one embodiment of the present disclosure, causes a computer including: a transmitting part transmitting signal to another device by using a plurality of antennas on different positions of a vehicle; receiving part receiving signal from said another device; and a storage part storing statistical values derived by measuring in advance received signal strengths of signals transmitted from a part of the plurality of antennas in association with information identifying antennas of transmission sources, for each of the inside and the outside of a vehicle cabin of measured positions, to determine whether said another device is located inside or outside the vehicle cabin of the vehicle, and to function as: a failure detection part detecting an antenna having failed among the plurality of antennas; a selection part selecting antennas for use from remaining antennas of the plurality of antennas except for the antenna having failed detected by the failure detection part; a reading part reading statistical values from the storage part relating to received signal strength of signals transmitted from the antennas for use; a determination part determining whether said another device is located inside or outside the vehicle cabin of the vehicle by calculating and comparing statistical distances between the statistical values read by the reading part and received signal strengths of signals measured by said another device, the signals being transmitted from the selected antennas selected by the selection part, for each of the inside and the outside of the vehicle cabin.

A computer program according to one embodiment of the present disclosure, cause a computer including: a transmitting part transmitting a radio signal to another device disposed in a vehicle; receiving part receiving radio signal from said another device; a measurement part measuring a received signal strength; and a storage part storing statistical values derived by measuring in advance received signal strengths of signals at positions inside and outside a vehicle cabin the vehicle, the signals being transmitted from a part of a plurality of antennas on the vehicle, in association with information identifying antennas of transmission sources, for each of the inside and the outside of a vehicle cabin of measured positions, to determine whether the computer itself is located inside or outside the vehicle cabin of the vehicle, and to function as: a failure notification receiving part receiving a notification of antennas for use among the plurality of antennas; a reading part reading statistical values relating to received signal strengths of signals transmitted from the antennas for use identified by the notification received by the failure notification receiving part from the storage part; and a determination part determining whether the computer itself is located inside or outside the vehicle cabin of the vehicle by calculating and comparing statistical distances between the statistical values for each of the inside and the outside of the vehicle cabin read by the reading part and measured values obtained by measuring received signal strengths of signals transmitted from the antennas for use through the measurement part for each of the inside and the outside of the vehicle cabin.

In addition, the present application can be realized not only as a vehicle communication system, an in-vehicle device, and a portable device including such a characteristic processing part but also as an in-vehicle communication method having such a characteristic process as a step or as a program causing a computer to perform such a step. Furthermore, the present application may be realized as a semiconductor integrated circuit realizing a part or the whole of a vehicle communication system, an in-vehicle device, and a portable device or may be realized as any other system including a vehicle communication system, an in-vehicle device, and a portable device.

According to the description presented above, a vehicle communication system capable of determining whether the position of a portable device is inside or outside the vehicle cabin with high accuracy even in a case where some of on-vehicle antennas has failed, an in-vehicle device and a portable device configuring the vehicle communication system, and a computer program can be provided.

The above and further objects and features will more fully be apparent from the following detailed description with accompanying drawings.

BRIEF DESCRIPTION OF THE DRAWINGS

FIG. 14 is an explanatory diagram illustrating an example of priority level information stored in a storage part according to Embodiment 2.

FIG. 15 is an explanatory diagram illustrating an example of priority level information stored in a storage part according to Embodiment 3.

FIG. 17 is an explanatory diagram illustrating a type selected for each area in a case where a first transmitting antenna has failed.

FIG. 18 is an explanatory diagram illustrating a type selected for each area in a case where a second transmitting antenna has failed.

FIG. 19 is an explanatory diagram illustrating a type selected for each area in a case where a third transmitting antenna has failed.

FIG. 20 is an explanatory diagram illustrating a type selected for each area in a case where a fourth transmitting antenna has failed.

DETAILED DESCRIPTION

Description of Embodiment of Present Disclosure

Figure 1:
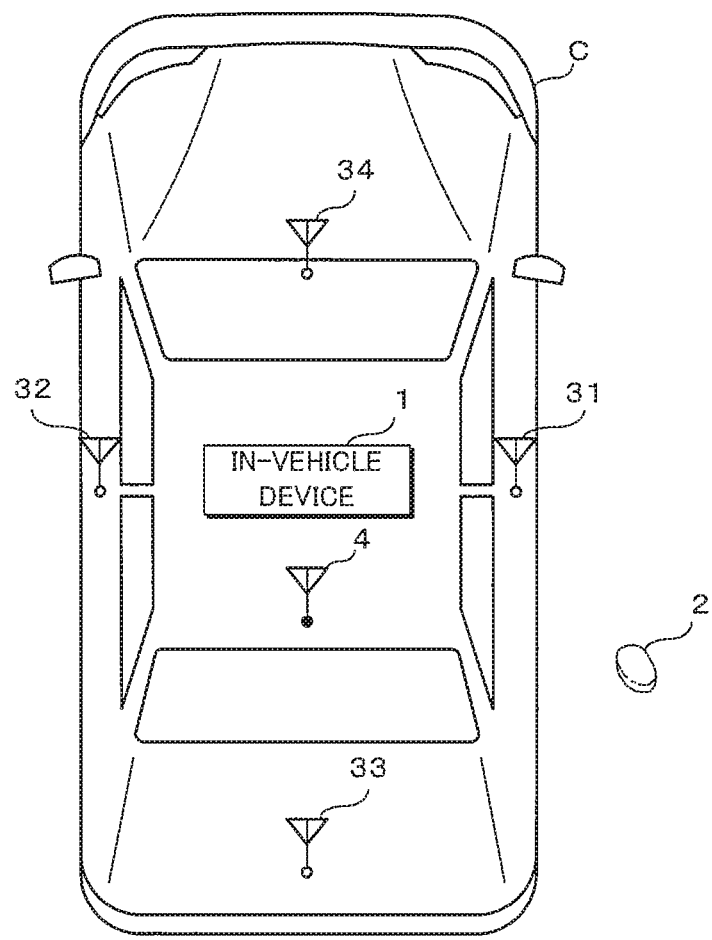
FIG. 1 is a block diagram illustrating an example of the configuration of a vehicle communication system according to Embodiment 1.

First, embodiments of the present disclosure will be listed and described. At least some of the embodiments described below may be arbitrarily combined.

(1) A vehicle communication system according to one embodiment of the present disclosure, comprises: an in-vehicle device transmitting and receiving signals by using a plurality of antennas disposed at different positions of a vehicle; and a portable device receiving signals transmitted from one or more of the plurality of antennas and transmitting signals in response to the received signals, wherein the in-vehicle device comprises: a storage part storing statistical values derived by measuring in advance received signal strengths of signals transmitted from a part of the plurality of antennas in association with information identifying antennas of transmission sources, for each of the inside and the outside of a vehicle cabin of measured positions; a failure detection part detecting an antenna having failed among the plurality of antennas; a selection part selecting antennas for use from remaining antennas of the plurality of antennas except for the antenna having failed detected by the failure detection part; a reading part reading statistical values corresponding to the selected antennas from the storage part; and a determination part determining whether the portable device is located inside or outside the vehicle cabin of the vehicle by calculating and comparing statistical distances between the statistical values read by the reading part and received signal strengths of signals measured by the portable device, the signals being transmitted from the selected antennas selected by the selection part, for each of the inside and the outside of the vehicle cabin.

According to one embodiment of the present disclosure, in a case where it is detected that a part of a plurality of antennas has failed, for transmitting signals from the in-vehicle device toward a portable device, antennas for use are selected from the remaining antennas excluding the failed antenna. Additionally, from statistical values of received signal strengths that are measured and stored in advance for determining the inside or the outside of the vehicle cabin, statistical values corresponding to the selected antennas are read. Statistical distances between the read statistical values and the received signal strengths of signals transmitted from the selected antennas are calculated for each of the inside and the outside of the vehicle cabin, and a vehicle cabin inside/outside determination is performed based on the statistical distances.

Since the antennas used for the determination are appropriately selected from among the remaining antennas excluding the failed antenna, received signal strengths from antennas capable of precisely determining the inside or the outside of the vehicle cabin among normal antennas can be used. In addition, since the statistical values of the received signal strengths of signals transmitted from the antennas are stored to be readable later with identifying which antenna is a transmission source, even in a case where any antenna has failed among the plurality of disposed antennas, an operation such as the calculation of statistical distances can be performed by using the received signal strengths of signals transmitted by antennas that are appropriately selected from among the remaining antennas.

(2) The storage part, for each of a plurality of different areas commonly including a vehicle cabin inner space of the vehicle, stores statistical values of each of the inside and the outside derived in advance based on received signal strengths of signals transmitted from the plurality of antennas measured at multiple positions inside and outside each of the plurality of areas, for each of different combinations of antennas, the reading part reads for each of the plurality of areas statistical values of one of the different combinations corresponding to the antennas selected by the selection part from the statistical values stored in the storage part for each of the different combinations of antennas, and the determination part includes an area determining part determining whether the portable device is located inside or outside of an area, for each of the plurality of areas, by calculating and comparing statistical distances for each of the inside and the outside of the area between the statistical values read by the reading part and the received signal strengths measured by the portable device, the signal being transmitted from the antennas selected by the selection part, and the portable device is determined to be located inside the vehicle cabin of the vehicle if the area determining part determines that the portable device is located inside all the areas.

According to one embodiment of the present disclosure, the statistical values relating to the inside/outside determination stored in advance are derived as statistical values for each combination of a plurality of different antennas obtained by combining a part of a plurality of antennas disposed in the vehicle. In addition, as the statistical values, for each of a plurality of different areas commonly including a vehicle cabin inner space relating to the inside/outside of the vehicle, statistical values acquired by performing measurement inside and outside each area are used. For each area including the vehicle cabin inner space, by determining the inside or the outside by using the statistical values of a corresponding combination, compared to a case where comparison with statistical values for each of the inside and the outside measured inside and outside one vehicle cabin inner space is performed, the number of processes required for generating the statistical values is effectively suppressed. Therefore the calculation of the statistical distances is simplified, and a determination having high accuracy can be performed.

(3) The storage part stores priority level information in association with each of the different combinations of antennas, and the reading part reads statistical values of one of the different combinations in association with priority level information having a higher priority stored in the storage part.

According to one embodiment of the present disclosure, when the remaining antennas acquired by excluding an antenna that has failed are selected, all the remaining antennas do not need to be used, and rather, by not using a part of the remaining antennas, there are cases where the determination accuracy is improved. Accordingly, priority level information is stored with being associated with a combination of antennas to be selected with priority so as to realize a determination having high accuracy even if an antenna that has failed is present, so that it is clear that an antenna to be selected and statistical values to be read. Therefore, also in a case where an antenna that has failed is present, a determination having high accuracy can be performed.

(4) Priority level information different for each of the plurality of areas are stored for each of the different combinations in the storage part.

When the remaining antennas except for an antenna that has failed are selected, a combination of antennas for use improving the determination accuracy is different for each area that is a determination target. In one embodiment of the present disclosure, by associating a different priority level with each of a plurality of areas, a combination of antennas for use and corresponding statistical values can be configured to be different for each of a plurality of areas, and, even in a case where an antenna that has failed is present, a determination having high accuracy can be performed.

(5) An in-vehicle device according to one embodiment of the present disclosure, transmitting a signal to another device by using a plurality of antennas disposed at different positions of a vehicle and receiving a signal from said another device, comprises: a storage part storing statistical values derived by measuring in advance received signal strengths of signals transmitted from a part of the plurality of antennas in association with information identifying antennas of transmission sources, for each of the inside and the outside of a vehicle cabin of measured positions; a failure detection part detecting an antenna having failed among the plurality of antennas; a selection part that selecting antennas for use from remaining antennas of the plurality of antennas except for the antenna having failed detected by the failure detection part; a reading part reading statistical values corresponding to the selected antennas from the storage part; and a determination part determining whether said another device is located inside or outside the vehicle cabin of the vehicle by calculating and comparing statistical distances between the statistical values read by the reading part and a measure result of received signal strengths received from said another device for each of the inside and the outside of the vehicle cabin.

According to one embodiment of the present disclosure, when a vehicle cabin inside/outside determination is performed on the in-vehicle device side, similar to Aspect (1) described above, statistical values corresponding to selected antennas from the remaining antennas excluding the antenna that has failed are read, and statistical distances between the read statistical values and the received signal strengths measured for signals transmitted from the selected antennas are compared for each of the inside and the outside of the vehicle cabin.

Also in a case where any antenna has failed among a plurality of disposed antennas, an operation such as the calculation of statistical distances can be performed using the received signal strengths of signals transmitted by the antennas that are appropriately selected, and a vehicle cabin inside or outside determination having high accuracy can be performed.

(6) A portable device according to one embodiment of the present disclosure receiving a signal transmitted from a plurality of antennas disposed at different positions of a vehicle and transmitting a signal in response to the received signals, comprises: a storage part storing statistical values derived by measuring in advance received signal strengths of signals at positions inside and outside a vehicle cabin, the signals being transmitted from the plurality of antennas, in association with information identifying antennas of transmission sources, for each of the inside and the outside of a vehicle cabin of measured positions; a notification receiving part receiving a notification of antennas for use among the plurality of antennas; a reading part reading the statistical values for each of the inside and the outside of the vehicle cabin, from the storage part, relating to received signal strengths of signals transmitted from the antennas for use identified by the notification received by the notification receiving part; a measurement part measuring the received signal strengths of the signals transmitted from the antennas for use; and a determination part determining whether the portable device is located inside or outside the vehicle cabin of the vehicle by calculating and comparing statistical distances between the statistical values read by the reading part and the received signal strengths measured by the measurement part, for each of the inside and the outside of the vehicle cabin.

According to one embodiment of the present disclosure, in the case where a vehicle cabin inside or outside determination is performed by a portable device, a plurality of kinds of statistical values relating to the vehicle cabin inside or outside determination are stored in the portable device, and, as information specifying antennas for use except for an antenna that has failed is notified from the in-vehicle device side, so that statistical values corresponding to antennas that are appropriately selected from among the remaining antennas excluding the failed antenna can be read by the portable device. Also in the portable device, similar to Aspect (1) described above, statistical distances between the received signal strengths measured for the signals transmitted from the antennas that are appropriately selected and the read statistical values are calculated and compared for each of the inside and the outside of the vehicle cabin.

Also in a case where a part of a plurality of disposed antennas has failed, by using the received signal strengths of signals transmitted by the antennas that are appropriately selected from among the remaining antennas, a vehicle cabin inside/outside determination having high accuracy based on the calculation of the statistical distances in the portable device can be performed.

(7) A computer program according to one embodiment of the present disclosure, causes a computer including: a transmitting part transmitting signal to another device by using a plurality of antennas on different positions of a vehicle; receiving part receiving signal from said another device; and a storage part storing statistical values derived by measuring in advance received signal strengths of signals transmitted from a part of the plurality of antennas in association with information identifying antennas of transmission sources, for each of the inside and the outside of a vehicle cabin of measured positions, to determine whether said another device is located inside or outside the vehicle cabin of the vehicle, and to function as: a failure detection part detecting an antenna having failed among the plurality of antennas; a selection part selecting antennas for use from remaining antennas of the plurality of antennas except for the antenna having failed detected by the failure detection part; a reading part reading statistical values from the storage part relating to received signal strength of signals transmitted from the antennas for use; a determination part determining whether said another device is located inside or outside the vehicle cabin of the vehicle by calculating and comparing statistical distances between the statistical values read by the reading part and received signal strengths of signals measured by said another device, the signals being transmitted from the selected antennas selected by the selection part, for each of the inside and the outside of the vehicle cabin.

In a case where it is detected that a part of a plurality of antennas has failed, the plurality of antenna being used for transmitting signals from the in-vehicle device toward a portable device, antennas for use are selected from the remaining antennas acquired by excluding the failed antenna. Additionally, from statistical values of received signal strengths that are measured and stored in advance for determining the inside or the outside of the vehicle cabin, a computer reads statistical values corresponding to the selected antennas, calculates statistical distances between the read statistical values and the received signal strengths of signals transmitted from the selected antennas for each of the inside and the outside of the vehicle cabin, and performs a vehicle cabin inside/outside determination based on the statistical distances.

Since the antennas to be used for the determination are appropriately selected from the remaining antennas except for the failed antenna, received signal strengths from antennas capable of precisely determining the inside or the outside of the vehicle cabin among normal antennas can be used. In addition, since the statistical values of the received signal strengths of signals transmitted from the antennas are stored to be readable later with identifying which antenna is a transmission source, even in a case where any antenna has failed among the plurality of disposed antennas, an operation such as the calculation of statistical distances can be performed by using the received signal strengths of signals transmitted by antennas that are appropriately selected from among the remaining antennas. Accordingly, also in a case where a part of a plurality of disposed antennas has failed, a vehicle cabin inside/outside determination having high accuracy based on the calculation of the statistical distances can be performed.

(8) A computer program according to one embodiment of the present disclosure, causes a computer including: a transmitting part transmitting a radio signal to another device disposed in a vehicle; receiving part receiving radio signal from said another device; a measurement part measuring a received signal strength; and a storage part storing statistical values derived by measuring in advance received signal strengths of signals at positions inside and outside a vehicle cabin the vehicle, the signals being transmitted from a part of a plurality of antennas on the vehicle, in association with information identifying antennas of transmission sources, for each of the inside and the outside of a vehicle cabin of measured positions, to determine whether the computer itself is located inside or outside the vehicle cabin of the vehicle, and to function as: a failure notification receiving part receiving a notification of antennas for use among the plurality of antennas; a reading part reading statistical values relating to received signal strengths of signals transmitted from the antennas for use identified by the notification received by the failure notification receiving part from the storage part; and a determination part determining whether the computer itself is located inside or outside the vehicle cabin of the vehicle by calculating and comparing statistical distances between the statistical values for each of the inside and the outside of the vehicle cabin read by the reading part and measured values obtained by measuring received signal strengths of signals transmitted from the antennas for use through the measurement part for each of the inside and the outside of the vehicle cabin.

When a received signal strengths is measured, a computer can obtain information identifying an antenna used as a transmission source of a signal, reads statistical values corresponding to antennas that are appropriately selected based on the statistical values relating to the received signal strengths that are measured and stored in advance for determining the inside or the outside of the vehicle cabin from the storage part, calculates statistical distances between the read statistical values and the measured received signal strengths for each of the inside and the outside, and performs a vehicle cabin inside or outside determination based on the statistical distances.

Also in a case where a part of a plurality of disposed antennas has failed, corresponding appropriate statistical values can be read by obtaining information identifying the antennas for use, and accordingly, by using the received signal strengths of signals transmitted by the antennas that are appropriately selected from the remaining antennas, a vehicle cabin inside or outside determination having high accuracy based on the calculation of the statistical distances can be performed.

Details of Embodiment of Present Disclosure

Specific examples of vehicle communication systems according to embodiments of the present disclosure will be described below with reference to the drawings. The present invention is not limited to such examples but is defined by the claims and is intended to include all the changes within the meaning and the scope of the equivalency to the claims.

Embodiment 1

FIG. 1 is a block diagram illustrating an example of the configuration of a vehicle communication system 1 according to Embodiment 1. The vehicle communication system according to Embodiment 1 includes: an in-vehicle device 1 that is mounted in a vehicle C; a portable device 2 that is carried and held by a user using the vehicle C; and multiple transmitting antennas 31, 32, 33, and 34 and a receiving antenna 4 mounted in the vehicle C.

The in-vehicle device 1 is one of electronic controller units (ECU) mounted in the vehicle C. The in-vehicle device 1 is a device that estimates the position of the portable device 2 and performs control in accordance with the estimated position. In addition, the in-vehicle device 1 performs control of devices of a body system such as vehicle door opening and closing control, locking and unlocking control of each vehicle door, window opening and closing control, turning-on and turning-off control of a headlight and a tail light, and turning-on and turning-off control of a room lamp. Since the configuration of the in-vehicle device 1 is an example, the in-vehicle device 1 may be configured as an ECU performing a vehicle cabin inside/outside determining process to be described later, and the control of each actuator (device) may be performed by another ECU.

The portable device 2 is an electronic key held by the user using the vehicle C. The portable device 2 has a function of transmitting and receiving radio signals used for enabling locking and unlocking of a vehicle door and starting of the engine or the driving battery system of the vehicle C.

The transmitting antennas 31, 32, 33, and 34 and the receiving antenna 4 are antennas used for the in-vehicle device 1 to transmit radio signals toward the portable device 2, and to receive them from the portable device 2. The transmitting antennas 31, 32, 33, and 34 are disposed at mutually-different positions in the vehicle C. For example, as illustrated in FIG. 1, the transmitting antenna 31 is disposed at a pillar (B-pillar) of a driver seat side, the transmitting antenna 32 is disposed at a pillar (B-pillar) of a front passenger seat side, the transmitting antenna 33 is disposed at a backdoor, and the transmitting antenna 34 is disposed inside a front instrument panel of the vehicle C. In FIG. 1, the right side in the traveling direction of the vehicle C is the driver seat side, and the left side in the traveling direction is the front passenger seat side. The receiving antenna 4, for example, is disposed inside a lining of a loop of the vehicle C.

In the vehicle communication system according to Embodiment 1, the in-vehicle device 1 performs control of unlocking a vehicle door by determination whether or not the portable device 2 approaches the vehicle C and is within a predetermined range, and starting the engine or the driving battery system in a case where the portable device 2 is located inside the vehicle cabin and a user's operation of turning on a start button is performed. In the vehicle communication system according to Embodiment 1, the in-vehicle device 1 determines whether or not the portable device 2 is located inside the vehicle cabin by determining whether the portable device 2 is located inside or outside multiple boundary surfaces along a space defined as a vehicle cabin inner space based on received signal strengths of signals transmitted from the transmitting antennas 31 to 34 that are measured by the portable device 2. Particularly, the in-vehicle device 1 according to Embodiment 1 detects a failure of any one of the transmitting antennas 31 to 34, selects antennas to be appropriately used from the remaining transmitting antennas 31 to 34 that have not failed, and performs a determination based on received signal strengths of a case where signals transmitted from the selected antennas are received by the portable device 2.

Hereinafter, each configuration realizing such control will be described in detail.

Figure 2:
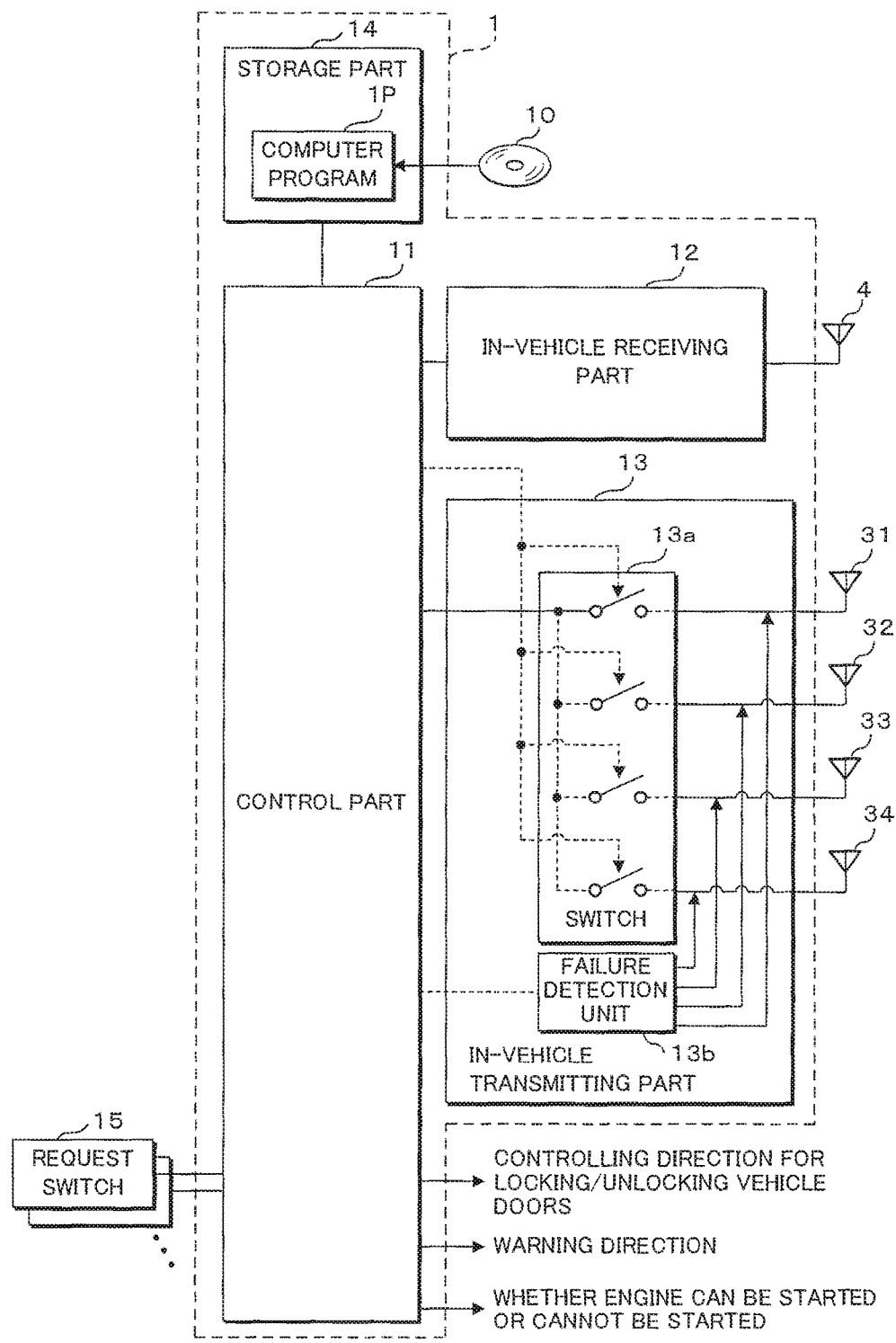
FIG. 2 is a block diagram illustrating a configuration of an in-vehicle device according to Embodiment 1.

FIG. 2 is a block diagram that illustrates the internal configuration of the in-vehicle device 1 according to Embodiment 1. The in-vehicle device 1 includes: a control part 11; an in-vehicle receiving part 12; an in-vehicle transmitting part 13; and a storage part 14.

The control part 11, for example, is implemented by a microcontroller that uses one or multiple central processing units (CPUs) and includes a read only memory (ROM), a random access memory (RAM), an input/output interface, a timer, and the like. The CPU of the control part 11 is connected to the in-vehicle receiving part 12, the in-vehicle transmitting part 13, and the storage part 14 through the input/output interface. The control part 11 controls the operation of each component by reading and executing a computer program stored in the storage part 14 and, particularly, by executing a computer program 1P to be described later, exhibits a function for performing a vehicle cabin inside/outside determination for the portable device 2 and selecting a determination system relating to the vehicle cabin inside/outside determination.

The storage part 14 is implemented by a nonvolatile memory such as a flash memory. The storage part 14 stores the computer program 1P realizing the function for performing a vehicle cabin inside/outside determination for the portable device 2 and selecting a determination system relating to the vehicle cabin inside/outside determination as the control part 11 controls the operation of each component of the in-vehicle device 1. In addition, the storage part 14 stores a vehicle identifier of the vehicle C and a portable device identifier used for identifying an authorized portable device 2 for the vehicle C. Furthermore, the storage part 14 stores, in advance, statistical values used for the vehicle cabin inside/outside determination for the portable device 2. Details of the statistical values will be described. While the control part 11 and the storage part 14 are illustrated as separate components in FIG. 2, the storage part 14 may be configured to be included inside the control part 11.

The computer program 1P stored in the storage part 14 may be embodied to be recorded on a computer-readable recording medium 10. The storage part 14 stores the computer program 1P read from the recording medium 10 by a reading device not illustrated in the drawing. The recording medium 10 is an optical disc such as a compact disc (CD)-ROM, a digital versatile disc (DVD)-ROM, or a blue-ray (registered trademark) disc (BD), a magnetic disk such as a flexible disk or a hard disk, a magneto-optical disk, a semiconductor memory, or the like. In addition, the computer program 1P according to Embodiment 1 may be downloaded from an external computer, which is not illustrated in the drawing, connected to a communication network not illustrated in the drawing and be stored in the storage part 14.

The in-vehicle receiving part 12 is connected to the receiving antenna 4 through a wire. The in-vehicle receiving part 12 receives a signal that is wirelessly transmitted from the portable device 2 through the receiving antenna 4. The in-vehicle receiving part 12 is implemented by a circuit that extracts a signal that is receiving object by eliminating a component of a carrier wave from a received signal and outputs the extracted signal to the control part 11. In Embodiment 1, an example is illustrated in which an ultra-high frequency band (UHF band) of 300 MHZ to 3 GHz is used as the frequency band of the carrier wave of a radio signal transmitted from the portable device 2 to the receiving antenna 4. However, the frequency band used by the receiving antenna 4 is not limited to the UHF band.

The in-vehicle transmitting part 13 includes a switch 13a therein and is selectively connected to the plurality of the transmitting antennas 31 to 34 through the switch 13a. The in-vehicle transmitting part 13 is implemented by a circuit that modulates a signal output from the control part 11 into a radio signal by using a carrier wave and transmits the radio signal after the modulation from one of the transmitting antennas 31 to 34 selected by the control part 11 and the switch 13a toward the portable device 2. In Embodiment 1, an example is illustrated in which a low frequency band (LF band) of 30 kHz to 300 MHz or a very low frequency band (VLF band) of 3 kHz to 30 kHz that is different from the frequency band used by the receiving antenna 4 is used as the frequency band of the carrier wave of signals transmitted from the transmitting antennas 31 to 34 to the portable device 2. However, the frequency band used by the transmitting antennas 31 to 34 is not limited to the LF band or the VLF band.

In addition, the in-vehicle transmitting part 13 includes a failure detection part 13b therein and detects failures of the transmitting antennas 31 to 34 with identifying which antenna has failed. The failure detection part 13b, for example, is implemented by a circuit that detects an open-circuit or a short-circuit of the transmitting antennas 31 to 34. In more detail, the failure detection part 13b measures a resistance value of a resistor disposed in the part and detects an open-circuit or a short-circuit by determining whether or not the resistance value enters a predetermined range. If an open circuit or a short circuit is detected, the failure detection part 13b is configured to notify the control part 11 of a result of the detection. The control part 11 can detect a failure of the transmitting antennas 31 to 34 with identifying which transmitting antenna is failed based on the result of the detection notified from the failure detection part 13b. The failure detection part 13b is not limited to the configuration in which an open circuit or a short circuit is detected by measuring a resistance value but may be configured to measure current values or voltage values at the timing for transmission of control signals from the control part 11 to the transmitting antennas 31 to 34 and detect any failure based on whether or not the measured values enter a predetermined range.

In addition, the CPU of the control part 11 is connected to multiple request switches 15 through an input/output interface. One of the request switches 15, for example, is a door lock switch used for locking or unlocking a vehicle door on the driver seat side or the front passenger seat side and is disposed at a door handle on the outer side of the vehicle door. As the door lock switch, a push button may be used, or a contact sensor detecting the contact of a user's hand may be used. Another switch among the request switches 15, for example, is a start switch used for giving a notification of an operation state of a start button used for starting the engine or the driving battery system and is disposed on the driver seat side of the instrument panel. As the start button, a push button may be used, or a contact sensor detecting the contact of a user's hand may be used. In addition, a further another switch among the request switches 15 is a courtesy switch and may be a switch detecting opening/closing of the vehicle door.

In Embodiment 1, while the request switches 15 are configured to be directly connected to the control part 11, the configuration is not limited thereto, but information of switches may be obtained from another ECU through a signal line or an in-vehicle network.

In the in-vehicle device 1, the control part 11 recognizes the operation state of each switch from the request switches 15. The control part 11 performs locking/unlocking of vehicle doors, outputting an indication whether or not the engine or the driving battery system can be started, a process of outputting a warning to a user as necessary, and the like based on the recognized operation state and a determination result acquired by the vehicle cabin inside/outside determining process to be described later. For example, in a case where an unlocking operation of vehicle doors is recognized to have been performed by a user from the request switch 15, the control part 11 determines whether or not the portable device 2 is located within a predetermined distance from the vehicle C (the operation can be performed outside the vehicle cabin) and, in case of being located, outputs a vehicle door unlocking direction signal to a locking device of each vehicle door. To the contrary, in a case where a locking operation of the vehicle doors is recognized to have been performed by a user from the request switch 15, the control part 11 determines whether or not the portable device 2 is located inside the cabin of the vehicle C and, in case of being located inside, determines locking-in and outputs a warning direction to a horn or outputs a headlight blinking direction without performing locking the door. In a case where an operation of turning on the start button is recognized to have been performed by a user from the request switch 15, the control part 11 determines whether or not the portable device 2 is located inside the cabin of the vehicle C and, only in case of being located inside, outputs a signal representing that the engine or the driving battery system can be started to an engine control system or a driving battery control system. In this way, the in-vehicle device 1 performs each control process based on a result of the vehicle cabin inside/outside determination for the portable device 2.

Figure 3:
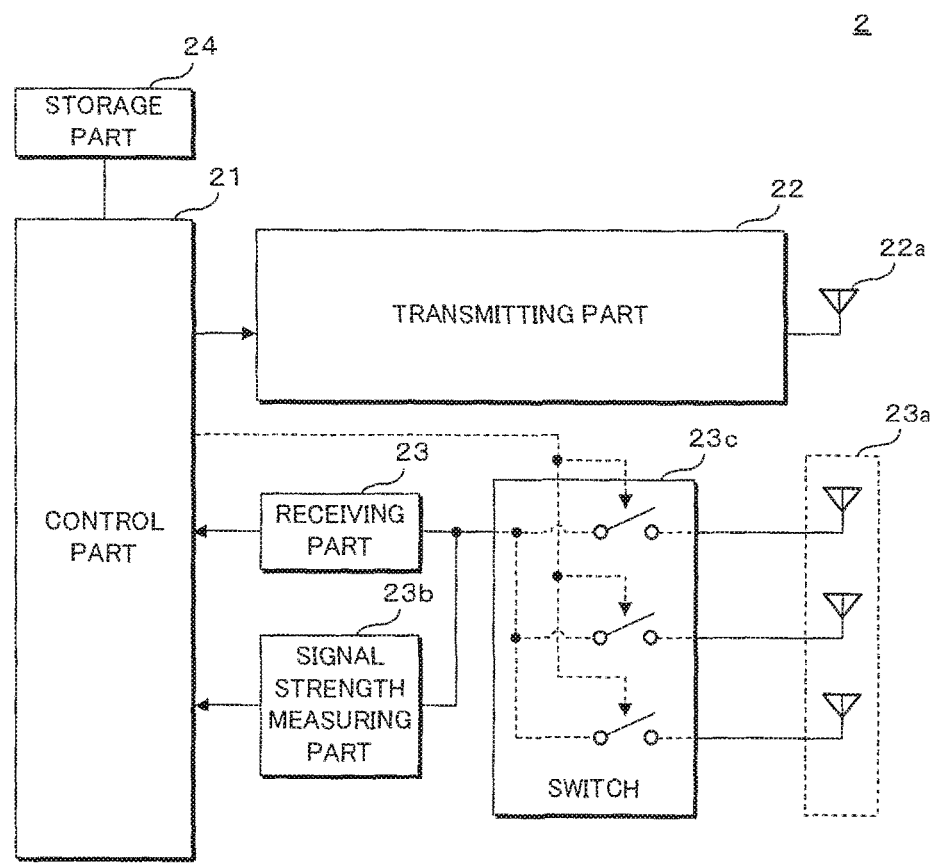
FIG. 3 is a block diagram illustrating a configuration of a portable device according to Embodiment 1.

Next, the portable device 2 held by a user will be described. FIG. 3 is a block diagram illustrating a configuration of the portable device 2 according to Embodiment 1. The portable device 2 includes: a control part 21; a transmitting part 22; a receiving part 23; a signal strength measuring part 23b; and a storage part 24.

The control part 21, for example, is a microcontroller that uses one or a plurality of CPUs or a multi-core CPU and includes a ROM, a RAM, an input/output interface, a timer, and the like. The CPU of the control part 21 is connected to the transmitting part 22, the receiving part 23, and the storage part 24 through the input/output interface. The control part 21 executes a control program stored in the storage part 24, thereby controlling the operation of each component.

The storage part 24 is implemented by a nonvolatile memory such as a flash memory. The storage part 24 stores a control program realizing a vehicle cabin inside/outside determination for the portable device 2 and a function for selecting a determination system relating to the vehicle cabin inside/outside determination as the control part 21 controls the operation of each component of the portable device 2. On the basis of the control program, the control part 21 performs a process of transmitting a response signal and the like including information required for the vehicle cabin inside/outside determination toward the in-vehicle device 1. In addition, the storage part 24 stores a portable device identifier used for identifying the own portable device 2, a vehicle identifier of a corresponding vehicle C, and a specific key for authentication. While the control part 21 and the storage part 24 are illustrated as separate components in FIG. 3, the storage part 24 may be configured to be included inside the control part 21.

The receiving part 23 is implemented by a circuit that selects one radio signal from among three radio signals received by a three-axial antenna 23a in accordance with the switch 23c, extracts a signal that is a receiving object by eliminating the component of a carrier wave from the selected radio signal, and outputs the extracted signal to the control part 21. The three-axial antenna 23a is an antenna in which three coils are arranged toward directions that are orthogonal to each other. In Embodiment 1, as the frequency band of the carrier wave of radio signals received by the three-axial antenna 23a, the LF band or the VLF band is used. However, the frequency band used by the three-axial antenna 23a is not limited to such a frequency band as long as it corresponds to the transmitting antennas 31 to 34 disposed on the in-vehicle device 1.

The signal strength measuring part 23b measures the received signal strength of the radio signal selected by the switch 23c among radio signals received through the three-axial antenna 23a and outputs the measured received signal strength to the control part 21. The control part 21 selects three radio signals supplied from the three-axial antenna 23a, measures the received signal strengths of the selected radio signals by using the signal strength measuring part 23b, and calculates a received signal strength by performing a vector operation based on results of the measurements for three directions that are orthogonal to each other. Accordingly, the control part 21 can acquire the received signal strengths from the transmitting antennas 31 to 34 disposed in the vehicle C regardless of an orientation or a posture of the portable device 2 relative to the vehicle C. Hereinafter, unless otherwise mentioned, a received signal strength calculated through a vector operation will be referred to as a received signal strength. In Embodiment 1, while the control part 21 is configured to calculate a received signal strength, it may be configured such that the portable device 2 transmits the received signal strengths of the three radio signals before the vector operation to the in-vehicle device 1, and the control part 11 of the in-vehicle device 1 calculates a received signal strength.

The transmitting part 22 is implemented by a circuit that modulates a signal input by the control part 21 using a carrier wave and transmits a radio signal through the transmitting antenna 22a. In Embodiment 1, as the frequency band of the carrier wave of signals transmitted from the transmitting antenna 22a, the UHF band is used. However, the frequency band used by the transmitting antenna 22a is not limited to such a frequency band, as long as it responds to the in-vehicle receiving part 12 of the in-vehicle device 1.

A method for performing the vehicle cabin inside/outside determination for the portable device 2 based on radio signals transmitted/received between the in-vehicle device 1 and the portable device 2 configured as above by using the in-vehicle device 1 will be described in detail. In Embodiment 1, the received signal strengths of measurement signals transmitted from the multiple (four) transmitting antennas 31 to 34 disposed at different positions on the vehicle C are measured by the portable device 2. Then, in the in-vehicle device 1, a received signal strength vector having multiple (four) measured received signal strengths as its components is acquired, and the inside or outside is determined based on a comparison with statistical values relating to received signal strength vectors measured in advance at positions inside and outside of an area which is a determination target. More specifically, the in-vehicle device 1 compares the received signal strength vector (measured value) acquired through measurements with both a received signal strength vector (a sampled value of the inside) derived from a received signal strength measured in advance inside the vehicle cabin and a received signal strength vector (a sampled value of the outside) derived from received signal strength measured outside the vehicle cabin in advance. Therefore, the in-vehicle device 1 determines which one of the sampled value of the inside and of the outside is close to the measured value, thereby determines the inside or outside. However, the measured value does not coincide with the sampled value since the measured value is not measured at the completely same place as a place at which the sampled value is measured, and the received signal strength is influenced by peripheral environments. Accordingly, a statistical value including an average value of sampled values measured in advance at a plurality of positions is used as a comparison target. In more details, in the vehicle cabin inside or outside determining process according to Embodiment 1, a mean vector of received signal strength vectors measured in advance and an inverse covariance matrix thereof are used as statistical values, in order to use a Mahalanobis distance for determination which one of the sampled value of the inside of an area that is the determination target and the sampled value of the outside of the area is close to the measured value.

Here, the mean vector (a mean of sampled values) described above is calculated using Equations (1) and (2) presented below, and the inverse covariance matrix is calculated using Equations (3) and (4) presented below.

$$\vec{\mu} = \begin{bmatrix} \mu_1 \\ \mu_2 \\ \vdots \\ \mu_N \end{bmatrix} \quad (1)$$

$$\mu_n = E[X_n] \quad (2)$$

where $\vec{\mu}$: mean vector $X_n$: sampled value of received signal strength of signal transmitted from n-th transmitting antenna n: integer
N: number of transmitting antennas $$\Sigma = \begin{bmatrix} \Sigma_{11} & \Sigma_{12} & \cdots & \Sigma_{1N} \\ \vdots & \vdots & \cdots & \vdots \\ \Sigma_{N1} & \Sigma_{N2} & \cdots & \Sigma_{NN} \end{bmatrix} \quad (3)$$

$$\Sigma_{ij} = E[(X_i - \mu_i)(X_j - \mu_j)] \quad (4)$$

where i,j: integer

Figure 4A:
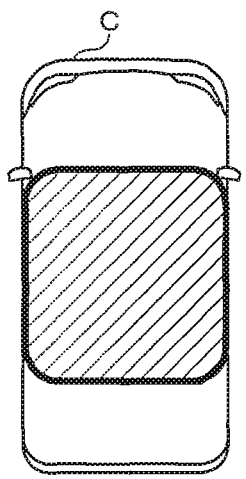
FIG. 4A is a schematic diagram conceptually illustrating inner space of a vehicle cabin.
Figure 4B:
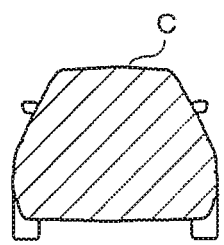
FIG. 4B is a schematic diagram conceptually illustrating inner space of a vehicle cabin.

In the vehicle cabin inside/outside determination according to Embodiment 1, statistical values based on sampled values acquired in this way are calculated for each of the inside and the outside of an area, which is a determination target, and, by determining one of the statistical value of the inside of the area and the statistical value of the outside of the area to which a received signal strength vector, which is represented in the following Equation (5), acquired at the time of performing the vehicle cabin inside/outside determination is similar by calculating and determining Mahalanobis distances as represented in Equation (6), the inside/outside of the vehicle cabin is determined. Here, the statistical values of the inside of the area will be referred to as first statistical values, and the statistical values of the outside of the area will be referred to as second statistical values.

$$\vec{\chi} = \begin{bmatrix} \chi_1 \\ \chi_2 \\ \vdots \\ \chi_N \end{bmatrix} \quad (5)$$

where $\vec{\chi}$: received signal strength vector $\chi_n$: received signal strength of signal transmitted from n-th transmitting antenna n: integer
N: number of transmitting antennas $$D^2 = (\vec{\chi} - \vec{\mu})^T \cdot \Sigma^{-1} \cdot (\vec{\chi} - \vec{\mu}) \quad (6)$$

where
D: Mahalanobis distance
$\vec{\mu}$: mean vector
$\Sigma^{-1}$: inverse covariance matrix A vehicle cabin inner space, which is a target for determining the inside or the outside, in the vehicle cabin inside/outside determination, for example, is a space in which the portable device 2 can be located as the portable device 2 is held or was held by a user in the cabin of the vehicle C. FIGS. 4A and 4B are schematic diagrams conceptually illustrating the space of the inside of the vehicle cabin. FIG. 4A illustrates a top view of the space of the inside of the vehicle cabin, and FIG. 4B illustrates an elevation view of the space of the inside of the vehicle cabin. In FIGS. 4A and 4B, portions to which hatching is applied are the space of the inside of the vehicle cabin. It is difficult to determine the inside/outside of one vehicle cabin inner space as a determination target area with high accuracy by using the received signal strength of signal from four transmitting antennas 31 to 34 according to Embodiment 1 without any further processing.

Thus, in Embodiment 1, for each of different areas (three-dimensional spaces) including a vehicle cabin inner space as a common space and having any one or more surface among boundary surfaces of the vehicle cabin inner space as a boundary surface thereof, the inside or the outside is determined, then the portable device 2 is determined to be located inside the vehicle cabin only if the portable device 2 is determined to be located inside of all the areas. For this reason, in the vehicle communication system according to Embodiment 1, the first statistical values and the second statistical values that are comparison targets of a measured value used for determining the inside or the outside are calculated for each of a plurality of areas.

Figure 5A:
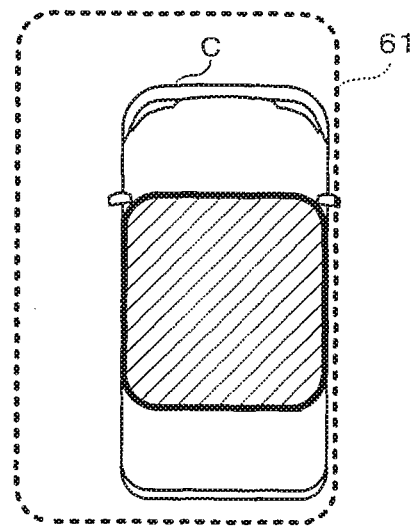
FIG. 5A is a conceptual diagram illustrating a first area.
Figure 5B:
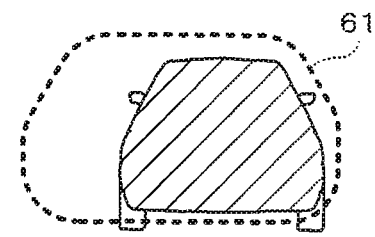
FIG. 5B is a conceptual diagram illustrating a first area.

A specific example of the plurality of areas will be illustrated. In the vehicle cabin inside/outside determination according to Embodiment 1, four areas including a first area 61 to a fourth area 64 are used as determination targets. FIG. 5A and FIG. 5B are conceptual diagrams illustrating the first area 61. FIG. 5A is a plan view of the first area 61, and FIG. 5B is an elevation view of the first area 61. The first area 61, as illustrated in FIG. 5A and FIG. 5B, has a shape that includes a boundary surface following a right side face of the vehicle cabin and includes a common vehicle cabin inner space that is illustrated using hatching. In addition, the first area 61 includes a left wall, a rear wall, and a face part along a windshield glass configuring the vehicle cabin. Since a part of the boundary surface of the first area 61 approximately coincides with the right side face of the vehicle cabin, in a case where the portable device 2 is located near the right wall of the vehicle C, by determining the portable device 2 to be located inside or outside the first area 61, the inside or the outside of the vehicle cabin on which the portable device 2 is located can be determined with high accuracy.

Figure 6A:
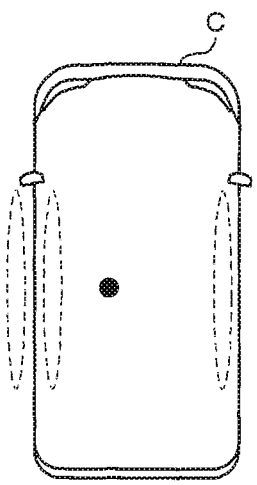
FIG. 6A is a conceptual diagram illustrating position for extracting sample value relating to the first area illustrated in FIGS. 5A and 5B.
Figure 6B:
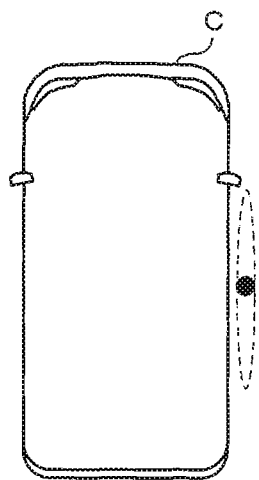
FIG. 6B is a conceptual diagram illustrating position for extracting sample value relating to the first area illustrated in FIGS. 5A and 5B.

Next, a specific example of extraction positions of sampled values relating to the first statistical values and the second statistical values used for determining the inside/outside of each area will be illustrated. FIGS. 6A and 6B are conceptual diagrams illustrating position for extracting sample value relating to the first area illustrated in FIGS. 5A and 5B. FIGS. 6A and 6B correspond to the plan view of FIG. 5A. FIG. 6A illustrates an extraction position of a sampled value of the inside of the first area 61, and FIG. 6B illustrates an extraction position of a sampled value of the outside of the first area 61. Each of the first statistical values and the second statistical values used for determining the inside/outside of the first area 61, as described above, is a mean vector and an inverse covariance matrix, the mean vector has a mean of sampled values as each component, and the sampled values are measured in advance inside/outside an area which is the determination target. In FIGS. 6A and 6B, broken-line ovals represent measurement positions used for obtaining the sampled values that are bases for calculating the first statistical values and the second statistical values of the first area 61, and black circles represent conceptual positions corresponding to mean vectors included in the first statistical values and the second statistical values.

The first statistical values and the second statistical values of the first area 61 are derived as below. In a manufacturing process for building a vehicle communication system in the vehicle C, by using the portable device 2 or a model measuring device, the received signal strengths of measurement signals transmitted from the transmitting antennas 31 to 34 are measured in advance at differential extraction positions within broken-line ovals illustrated in FIGS. 6A and 6B. For the received signal strengths measured at the extraction positions, mean vector and inverse covariance matrix are calculated using Equations (1) to (4) for each of the inside and the outside of the first area 61 and sets the mean vector and the inverse covariance matrix as the first statistical values of the first area 61 and the second statistical values of the first area 61.

The first statistical values and the second statistical values used for determining the inside or the outside of the first area 61, as described above, are values that are used for determining the inside or the outside of a boundary surface following the right wall with high accuracy in a case where the portable device 2 is located near the right wall of the vehicle C. Accordingly, as illustrated in FIG. 6B, while sampled values are collected at a plurality of positions following the vehicle cabin outer side of the right wall of the vehicle cabin for calculating the second statistical values defining the outer side of the first area 61, sampled values are collected at positions including outdoor positions near the left side face of the vehicle, as illustrated in FIG. 6A, such that a mean of the sampled values of the inside of the first area 61 does no overemphasize sampled values of the received signal strengths measured at positions proximal to the right side face, for calculating the first statistical values defining the inside of the first area 61.

Figure 7A:
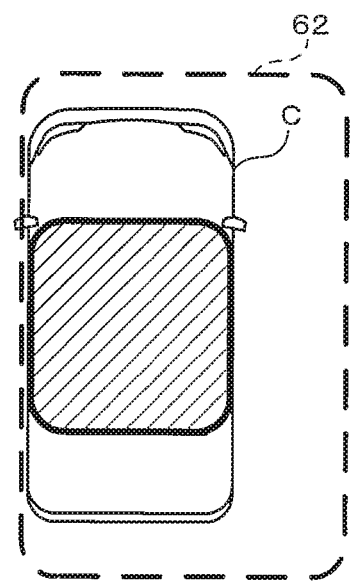
FIG. 7A is a conceptual diagram illustrating a second area.
Figure 7B:
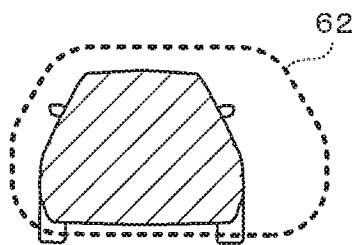
FIG. 7B is a conceptual diagram illustrating a second area.

FIGS. 7A and 7B are conceptual diagrams illustrating a second area 62. FIG. 7A is a plan view of the second area 62, and FIG. 7B is an elevation view of the second area 62. The second area 62, as illustrated in FIG. 7A and FIG. 7B, has a shape that includes a boundary surface following a left side face of the vehicle cabin and includes a common vehicle cabin inner space that is illustrated using hatching. In addition, the second area 62 includes a right wall, a rear wall, and a face part along a windshield glass configuring the vehicle cabin. Since a part of the boundary surface of the second area 62 approximately coincides with the left side face of the vehicle cabin, in a case where the portable device 2 is located near the left wall of the vehicle C, by determining the portable device 2 to be located inside or outside the second area 62, the inside or the outside of the vehicle cabin on which the portable device 2 is located can be determined with high accuracy.

Figure 8A:
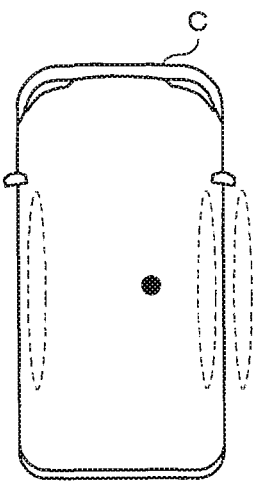
FIG. 8A is a conceptual diagram illustrating position for extracting sample value relating to a second area illustrated in FIGS. 7A and 7B.
Figure 8B:
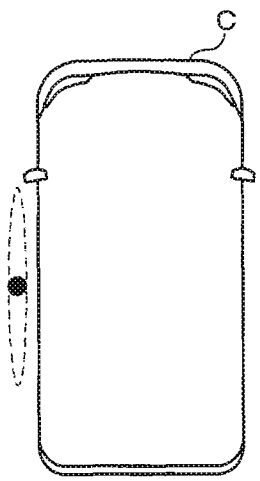
FIG. 8B is a conceptual diagram illustrating position for extracting sample value relating to the second area illustrated in FIGS. 7A and 7B.

FIGS. 8A and 8B are conceptual diagrams illustrating sampled value extraction positions relating to the second area 62 illustrated in FIGS. 7A and 7B. FIGS. 8A and 8B correspond to the plan view of FIG. 7A. FIG. 8A illustrates an extraction position of a sampled value of the inside of the second area 62, and FIG. 8B illustrates an extraction position of a sampled value of the outside of the second area 62. In FIGS. 8A and 8B, broken-line ovals represent measurement positions used for obtaining the sampled values that are bases for calculating the first statistical values and the second statistical values of the second area 62, and black circles represent conceptual positions corresponding to mean vectors included in the first statistical values and the second statistical values of the second area 62. The first statistical values and the second statistical values of the second area 62 can be obtained similar to the first statistical values and the second statistical values of the first area 61.

Figure 9A:
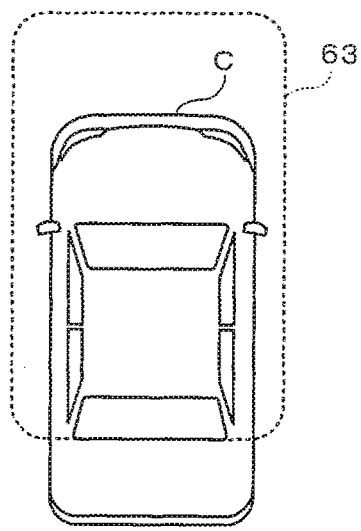
FIG. 9A is a conceptual diagram illustrating a third area.
Figure 9B:
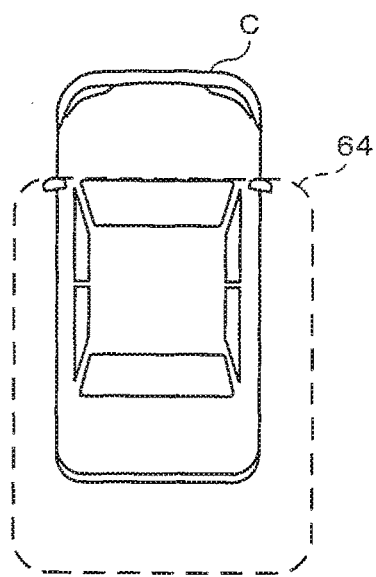
FIG. 9B is a conceptual diagram illustrating a fourth area.

FIG. 9A is a conceptual diagram illustrating a third area 63, and FIG. 9B is a conceptual diagram that illustrates a fourth area 64. As illustrated in FIG. 9A, the third area 63 has a shape that includes a boundary surface following a rear inner face of the vehicle cabin and includes a common vehicle cabin inner space. As illustrated in FIG. 9B, the fourth area 64 has a shape that includes a boundary surface following a front inner face of the vehicle cabin and includes a common vehicle cabin inner space.

Figure 10:
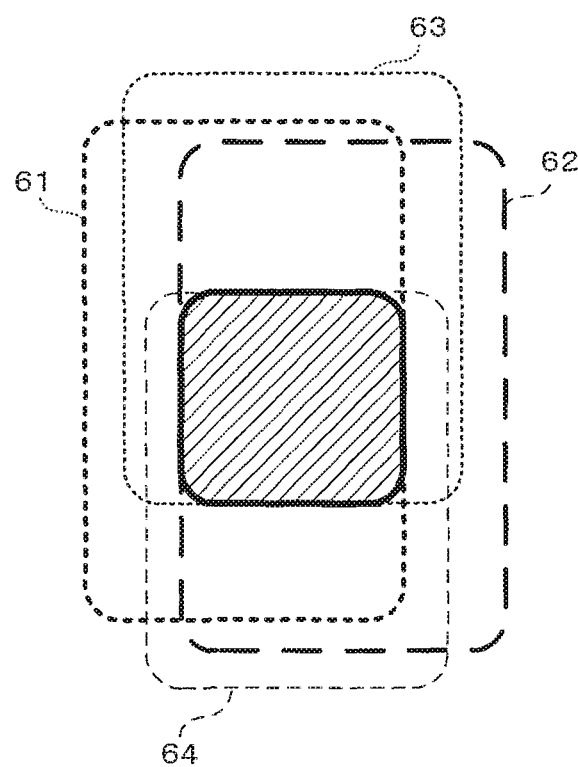
FIG. 10 is a conceptual diagram illustrating a first area to a fourth area.

FIG. 10 is a conceptual diagram illustrating the first area 61 to the fourth area 64. In FIG. 10 the hatched area represents an area corresponding to a vehicle cabin inner space. As illustrated in FIG. 10, the first area 61 to the fourth area 64 are different spaces but commonly include the vehicle cabin inner space. Since the first area 61 to the fourth area 64 respectively follow the right face, the left face, the rear face, and the front face of the vehicle cabin, a space within all of the inner sides of the first area 61 to the fourth area 64 approximately coincides with the vehicle cabin inner space.

In the storage part 14, as described above, the first statistical values and the second statistical values acquired by measuring sampled values for each area by using the portable device 2 or a model measuring device in the process of manufacturing are stored for each of the first area 61 to the fourth area 64. The in-vehicle device 1 performs a vehicle cabin inside/outside determination based on such statistical values stored in the storage part 14.

In Embodiment 1, furthermore, in preparation for a case where any one or more of the transmitting antennas 31 to 34 fail, the storage part 14 stores information representing which one of the remaining transmitting antennas 31 to 34 except for the failed antenna transmits signal to be received for use in measurement and statistical values corresponding to the respective information. More specifically, the storage part 14 stores information representing different combinations of the transmitting antennas 31 to 34 for use when any one or more of the antennas fail and statistical values corresponding to the respective combinations are stored.

Figure 11A:
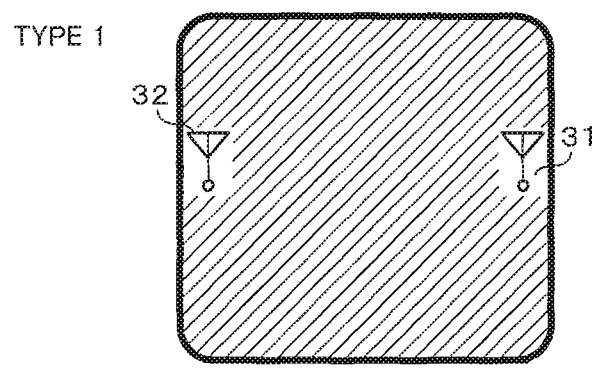
FIG. 11A is a conceptual diagram illustrating combinations of transmitting antennas stored in a storage part.
Figure 11B:
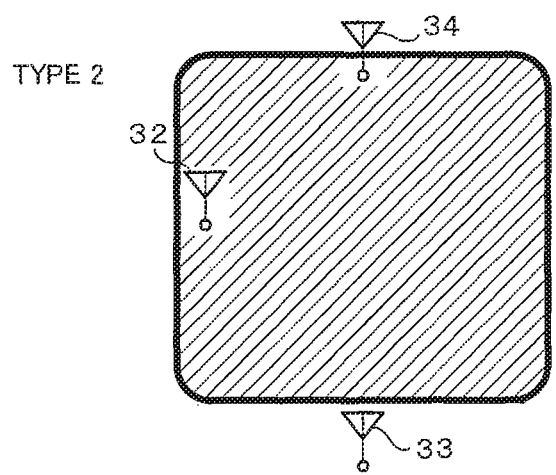
FIG. 11B is a conceptual diagram illustrating combinations of transmitting antennas stored in a storage part.
Figure 11C:
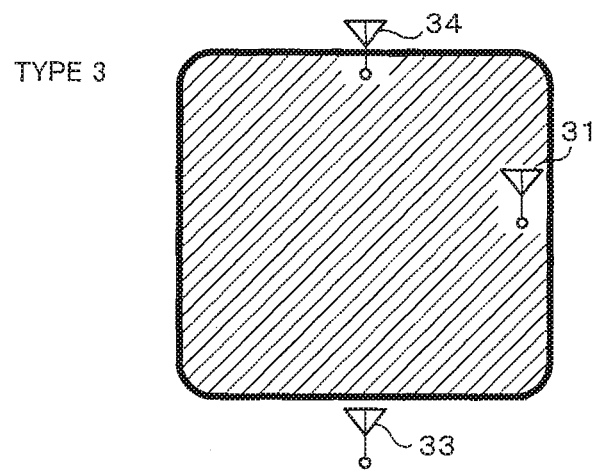
FIG. 11C is a conceptual diagram illustrating combinations of transmitting antennas stored in a storage part.
Figure 11D:
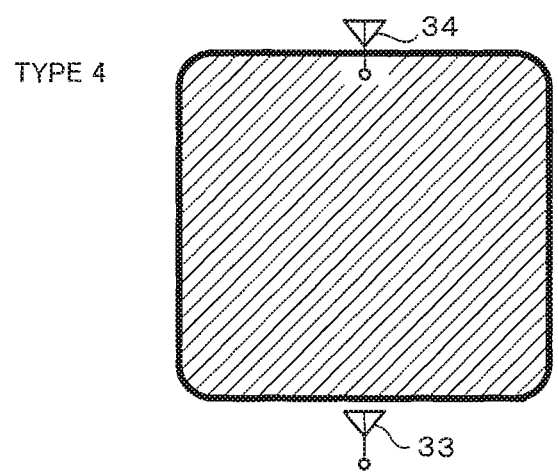
FIG. 11D is a conceptual diagram illustrating combinations of transmitting antennas stored in a storage part.
Figure 11E:
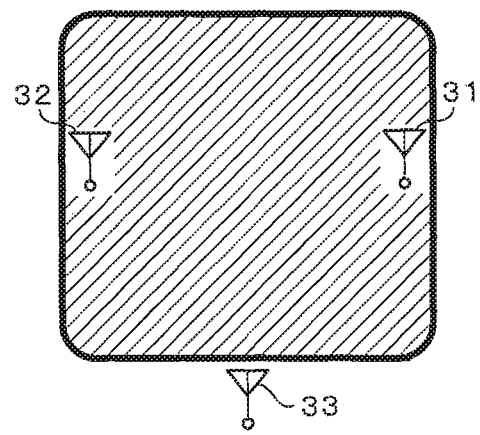
FIG. 11E is a conceptual diagram illustrating combinations of transmitting antennas stored in a storage part.
Figure 11F:
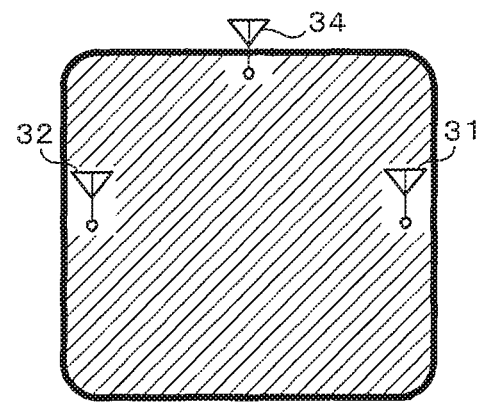
FIG. 11F is a conceptual diagram illustrating combinations of transmitting antennas stored in a storage part.

FIGS. 11A to 11F are conceptual diagrams illustrating combinations of the transmitting antennas 31 to 34 stored in the storage part 14. In FIGS. 11A to 11F, the hatched area represents a vehicle cabin inner space. FIG. 11A illustrates Type 1 using the first transmitting antenna 31 and the second transmitting antenna 32. FIG. 11B illustrates Type 2 using the second to fourth transmitting antennas 32 to 34. FIG. 11C illustrates Type 3 using the first, third and fourth transmitting antennas 31, 33 and 34. FIG. 11D illustrates Type 4 using the third and fourth transmitting antennas 33 and 34. FIG. 11E illustrates Type 5 using the first to third transmitting antennas 31 to 33. FIG. 11F illustrates Type 6 using the first, second and fourth transmitting antennas 31, 32 and 34. For example, the storage part 14 stores, for each identification information (type) used for identifying one of Types 1 to 6, identification information (the n-th) of the transmitting antennas 31 to 34 for use in one of Types 1 to 6 identified by each identification information, such as Type 1=(1, 2), Type 2=(2, 3, 4), . . . . In addition, a combination of all the transmitting antennas 31 to 34 may be stored as Type 0 (zero).

In addition, the storage part 14 stores the first statistical values and the second statistical values for each area calculated in advance for each type. For example, the first statistical values of Type 1 in the first area 61 is a two-dimensional mean vector and an inverse covariance matrix, the two-dimensional mean vector has a mean value of the received signal strengths of signals transmitted from the first transmitting antenna 31 at a plurality of positions within the range illustrated in FIG. 6A and a mean value of the received signal strengths of signals transmitted from the second transmitting antenna 32 at a plurality of positions within the same range as its components. The second statistical values of Type 1 in the first area 61 is a two-dimensional mean vector and an inverse covariance matrix, the two-dimensional mean vector having a mean value of the received signal strengths of signals transmitted from the first transmitting antenna 31 at a plurality of positions within the range illustrated in FIG. 6B and a mean value of the received signal strengths of signals transmitted from the second transmitting antenna 32 at a plurality of positions within the same range as its components. The first statistical values of Type 2 in the first area 61 is a three-dimensional mean vector and an inverse covariance matrix, the three-dimensional mean vector having a mean value of the received signal strengths of signals transmitted from the second transmitting antenna 32 at a plurality of positions within the range illustrated in FIG. 6A, a mean value of the received signal strengths of signals transmitted from the third transmitting antenna 33 at a plurality of positions within the same range, and a mean value of the received signal strengths of signals transmitted from the fourth transmitting antenna 34 at a plurality of positions within the same range as its components. This similarly applies to the other Types 3 to 6 in the first area 61 and the second area 62 and the third area 63.

The portable device 2 is pass through an opening part such as an open door. Accordingly, a boundary surface through which the portable device 2 cannot pass, has a low priority level as the inside/outside determination target. Thus, the fourth area 64 having the front face not having a door in the vehicle C as a boundary surface is omitted from the inside/outside determination target in a case where some of the transmitting antennas 31 to 34 have failed. For this reason, the statistical values (the first statistical values and the second statistical values) for Types 1 to 6 of the fourth area 64 may not be stored in the storage part 14.

A process executed by the vehicle communication system including the in-vehicle device 1 and the portable device 2 configured as described above will be described.

Figure 12A:
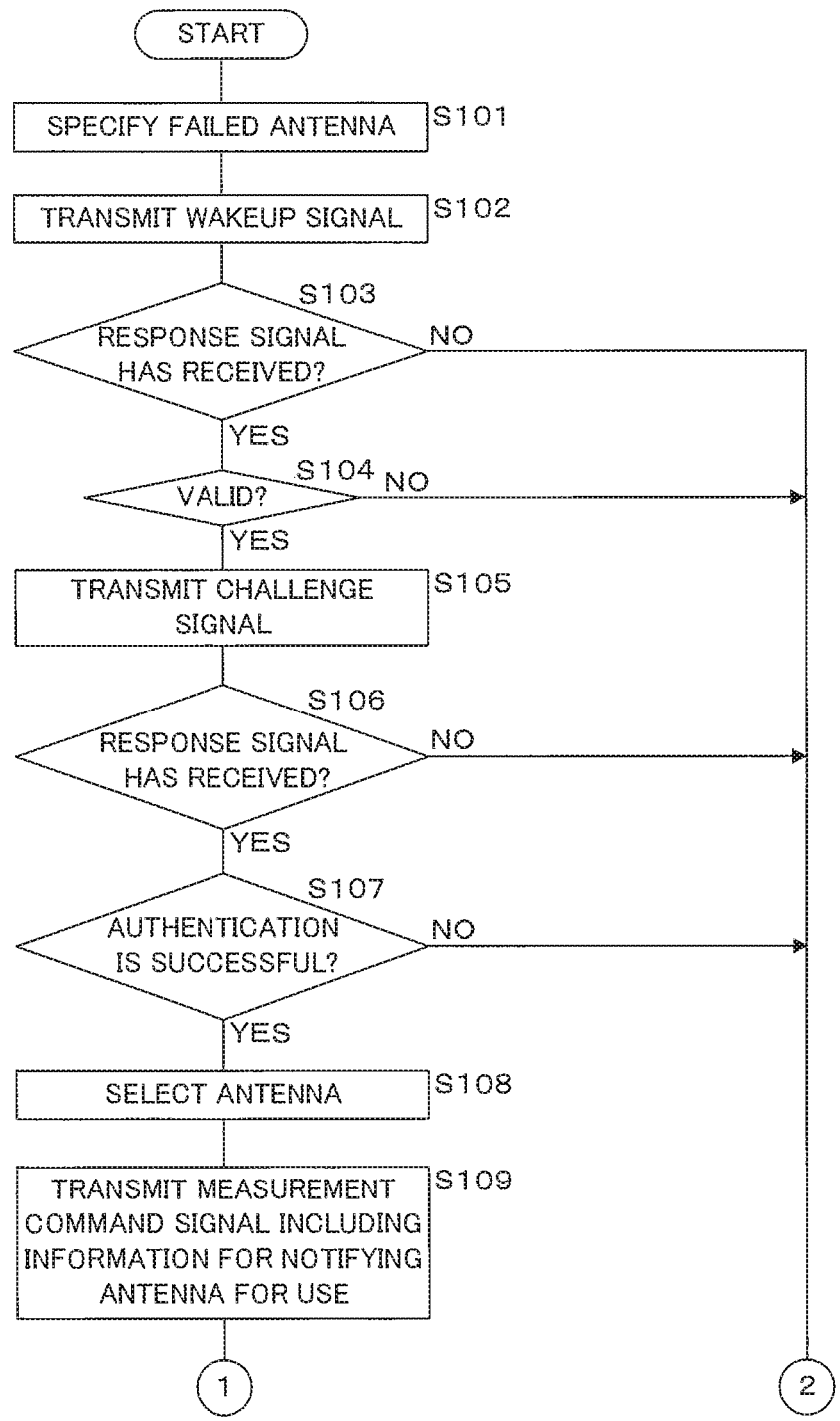
FIG. 12A is a flow chart illustrating an example of a processing procedure of a vehicle cabin inside/outside determination executed by an in-vehicle device according to Embodiment 1.
Figure 12B:
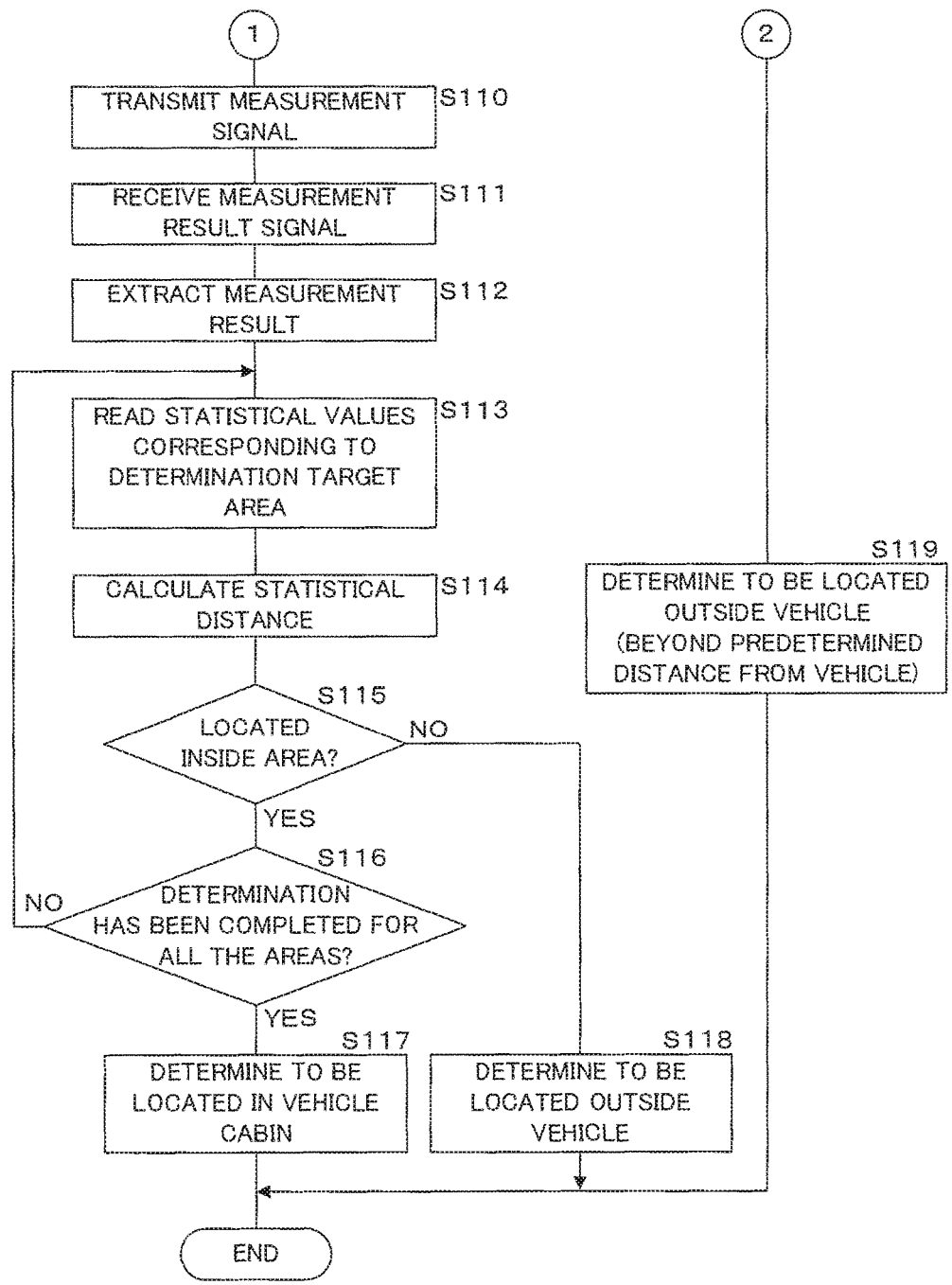
FIG. 12B is a flow chart illustrating an example of a processing procedure of a vehicle cabin inside/outside determination executed by an in-vehicle device according to Embodiment 1.

FIGS. 12A and 12B are flow charts that illustrating an example of a processing procedure of a vehicle cabin inside/outside determination executed by the in-vehicle device 1 according to Embodiment 1.

The control part 11 of the in-vehicle device 1 specifies an antenna that has failed by using the failure detection part 13b (Step S101). The control part 11 transmits a wakeup signal from a part (for example, only the transmitting antenna 34) or the whole of the transmitting antennas 31 to 34 that have not failed among the transmitting antennas 31 to 34, the signal including information of its own vehicle identifier stored in the storage part 14 (Step S102). The control part 11 determines whether or not the response signal has been received by the receiving antenna 4 in response to the transmitted wakeup signal (Step S103). In Step S103, the control part 11 provides a predetermined extension time for receiving the response signal and determines that the response signal has been received if the receiving antenna 4 receives the response signal before the extension time elapses and determines that the response signal has not been received if the extension time elapses.

If it is determined that the response signal has been received (S103: Yes), the control part 11 extracts information of a portable device identifier included in the response signal and determines whether or not the portable device 2 is valid based on whether or not the extracted information coincides with the portable device identifier stored in the storage part 14 (Step S104).

If the portable device 2 is determined to be valid in Step S104 (S104: Yes), the control part 11 generates data for challenge response authentication, transmits a challenge signal including the generated data from the transmitting antennas 31 to 34 that have not failed from among the transmitting antennas 31 to 34 (Step S105), and determines whether or not a response signal for the challenge signal has been received (Step S106).

If it is determined that the response signal has been received (S106: Yes), the control part 11 extracts response data from the received response signal and determines whether or not authentication of the portable device 2 is successful based on the extracted response data (Step S107).

If it is determined that the authentication is successful (S107: Yes), the control part 11 selects antennas from the remaining antennas except for a failed antenna among the transmitting antennas 31 to 34 so as to command the portable device 2 to measure received signal strengths (Step S108). In Step S108, the control part 11 may select a type representing a combination of the transmitting antennas 31 to 34 illustrated in FIGS. 11A to 11F. In addition, in Step S108, if any antenna that has failed is not specified in Step S101, the control part 11 selects all the transmitting antennas 31 to 34.

Next, the control part 11 transmits a measurement command signal from a part or the whole of the selected antennas (for example, only the transmitting antenna 34) (Step S109). At this time, the control part 11 makes the measurement command signal include information (information used for identifying one of the types illustrated in FIGS. 11A to 11F) used for notifying the portable device 2 of the transmitting antennas 31 to 34 for use.

Until a predetermined time elapses after the transmission of the measurement command signal, the control part 11 sequentially selects one of the antennas selected in Step S108 from among the transmitting antennas 31 to 34 by using the switch 13a and transmits a measurement signal from the selected antenna (Step S110).

Next, after the transmission of the measurement signal, the control part 11 receives a measurement result signal including a measurement result by using the receiving antenna 4 (Step S111). The control part 11 extracts the measurement result from the received measurement result signal (Step S112). More specifically, the extracted measurement result includes the received signal strength of each measurement signal transmitted from one of the transmitting antennas 31 to 34 included in the type selected by the control part 11.

The control part 11, for each of a plurality of areas that are determination targets, reads statistical values of the type selected in Step S109 from the storage part 14 (Step S113) and calculates statistical distances for each of the inside and the outside based on the received signal strengths of the received measurement results and the read statistical values (Step S114). The control part 11, for each determination target area, determines whether or not the portable device 2 is located inside the area (Step S115). In more details in Step S114, the control part 11 calculates a Mahalanobis distance between a received signal strength vector of the measurement results and the first statistical values of the selected type, and a Mahalanobis distance between the received signal strength vector of the measurement results and the second statistical values of the selected type by using Equations (5) and (6) described above. Then, in Step S115, the control part 11 compares the calculated results with each other and determines that the portable device 2 is located inside the area that is the determination target, if it is determined that the received signal strength vector is closer to the first statistical values in terms of statistical distance, that is the Mahalanobis distance, rather than to the second statistical values.

If it is determined the portable device 2 is located inside the area in Step S115 (S115: Yes), the control part 11 determines whether or not the determination has been completed for all the areas (Step S116). In addition, in Step S116, all of the four areas are determination target areas if an antenna that has failed is neither present nor specified in Step S101. Furthermore, three areas including the first area 61 to the third area 63 are all the determination target areas if an antenna that has failed is present, and the antenna that has failed is specified in Step S101. If it is determined that the determination for all the areas has not been completed in Step S116 (S116: No), the control part 11 returns the process to Step S113.

On the other hand, if it is determined that the determination for all the areas has been completed (S116: Yes), it is determined that the portable device 2 is determined to be located inside all the areas, and accordingly, the control part 11 determines that the portable device 2 is located inside the cabin of the vehicle C (Step S117) and ends the vehicle cabin inside/outside determining process.

if it is determined that the portable device 2 is located outside at least one of the plurality of areas in Step S115 (S115: No), the control part 11 determines that the portable device 2 is located outside the cabin of the vehicle C (Step S118) and ends the vehicle cabin inside/outside determining process.

In addition, if it is determined the response signal has not been received in Step S103 (S103: No), the extracted information does not coincide with the portable device identifier in Step S104 (S104: No), the response signal for the challenge signal has not been received in Step S106 (S106: No), or the authentication has failed in Step S107 (S107: No), the control part 11 determines that the portable device 2 is located outside the vehicle (beyond a predetermined distance from the vehicle C) (Step S119). Also in such a case, the control part 11 ends the vehicle cabin inside/outside determining process.

Figure 13A:
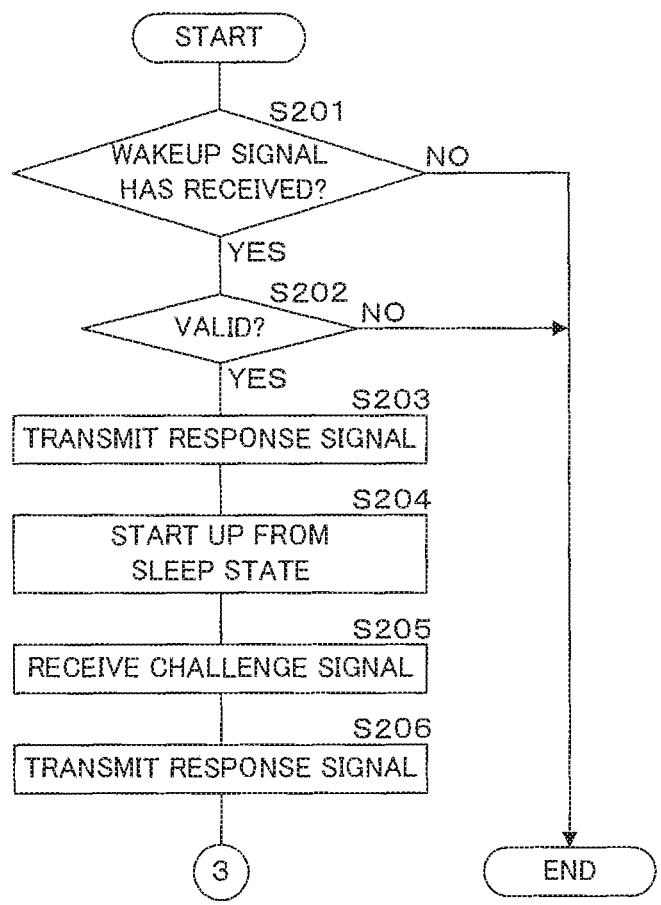
FIG. 13A is a flow chart illustrating an example of a processing procedure executed by a portable device according to Embodiment 1.
Figure 13B:
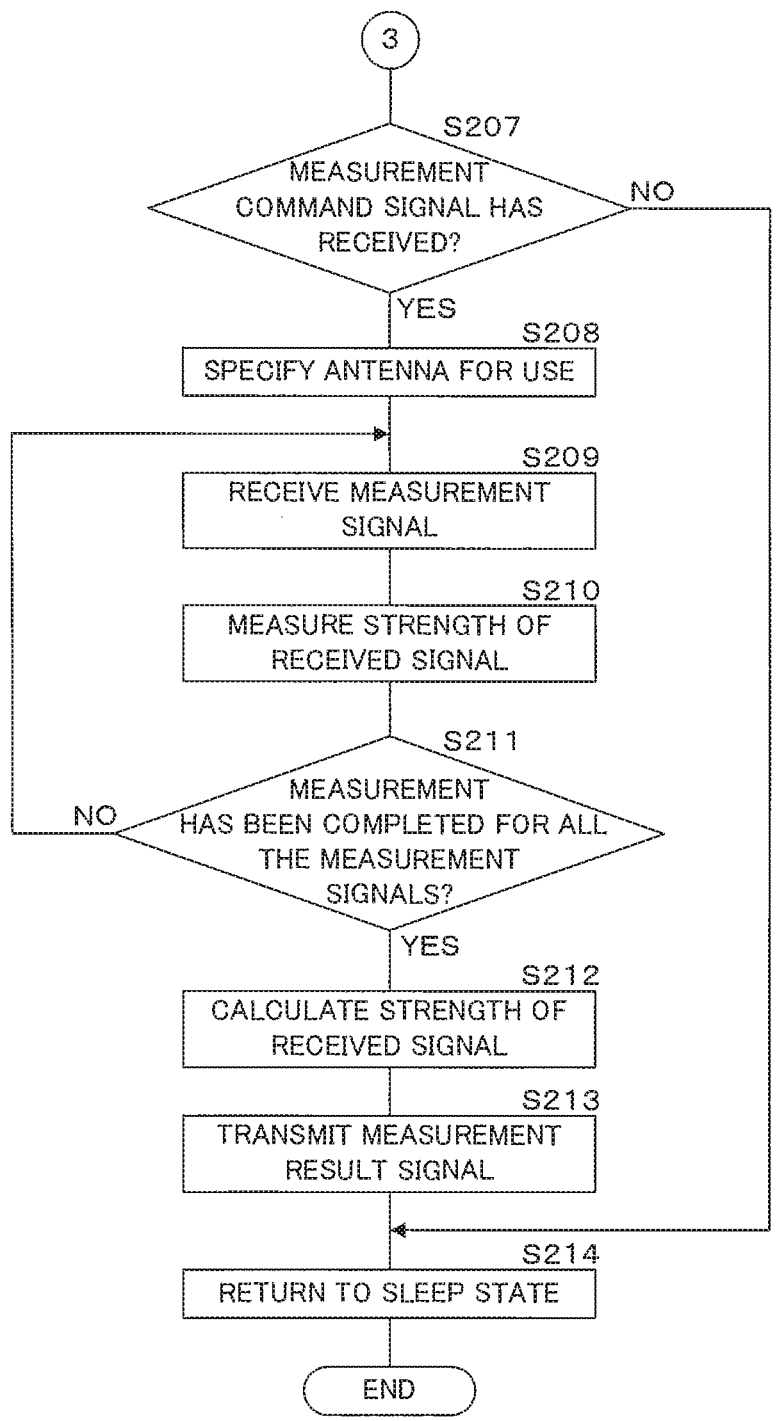
FIG. 13B is a flow chart illustrating an example of a processing procedure executed by a portable device according to Embodiment 1.

FIGS. 13A and 13B are flow charts illustrating an example of a processing procedure executed by the portable device 2 according to Embodiment 1. The processing procedure illustrated in the flow chart of FIGS. 13A and 13B corresponds to the processing procedure executed by the in-vehicle device 1 illustrated in the flow chart of FIGS. 12A and 12B.

The control part 21 of the portable device 2 determines whether or not a wakeup signal has been received by the tri-axial antenna 23a (Step S201). If the wakeup signal has been received (S201: Yes), the control part 21 determines the validness of the in-vehicle device 1 by collating the information of a vehicle identifier included in the wakeup signal and a corresponding vehicle identifier stored in the storage part 24 with each other (Step S202).

If it is determined that the in-vehicle device 1 is valid in Step S202 (S202: Yes), the control part 21 transmits a response signal including the data of the portable device identifier stored in the storage part 24 by using the transmitting antenna 22a (Step S203) and starts up from a sleep state (Step S204). The control part 21 receives a challenge signal transmitted from the in-vehicle device 1 in succession to the wakeup signal (Step S205), generates response data by performing a predetermined encryption operation by using data included in the challenge signal and a specific key stored in the storage part 24, and replies with a response signal including the generated response data (Step S206).

Next, the control part 21 determines whether or not a measurement command signal is received from the in-vehicle device 1 due to a success of an authentication using the replied response signal (Step S207). If it is determined that the measurement command signal has been received (S207: Yes), the control part 21 specifies an antenna for use based on a notification included in the measurement command signal (Step S208).

Until a predetermined time elapses after the reception of the measurement command signal, the control part 21 receives measurement signals transmitted from the antenna for use specified in Step S208 by using the tri-axial antenna 23a (Step S209) and measures signal strengths of three radio signals respectively by using the signal strength measuring part 23b, with sequentially selecting radio signal from signals supplied from the tri-axial antenna 23a by using the switch 23c (Step S210). In other words, for one measurement signal, the control part 21 measures received signal strengths corresponding to components of three axial directions of the tri-axial antenna 23a.

The control part 21 determines whether or not the measurement has been completed for all the measurement signals (Step S211) and, if it is determined that the measurement has not been completed (S211: No), the control part 21 sequentially receives multiple (two to four times) measurement signals transmitted from the antennas for use, and measures the received signal strengths by returning the process to Step S209 (S209 and S210).

If it is determined that the measurement has been completed (S211: Yes), the control part 21 calculates strength of received signal based on the received signal strength components of the measured three radio signals through a vector operation for each measurement signal (Step S212). The control part 21 transmits a measurement result signal including the acquired received signal strength as a result of the measurement by using the transmitting antenna 22a (Step S213), is returned to the sleep state (Step S214), and terminates the procedure.

If it is determined that the measurement command signal has not been received in Step S207 (S207: No), the authentication is not successful, and accordingly, the control part 21 is returned to the sleep state (S214) and terminates the procedure.

If it is determined that the wakeup signal has not been received in Step S201 (S201: No) or if it is determined the in-vehicle device 1 is invalid in Step S202 (S202: No), the control part 21 terminates the procedure.

A specific example of a precisely determination executed even if an antenna that has failed is present according to the processing procedure illustrated in flow charts of FIGS. 12A, 12B, 13A, and 13B will be described.

A procedure will be described which is performed in a case where the transmitting antenna 31 disposed on the right side of the vehicle C has failed among the transmitting antennas 31 to 34, for example, when a user performs an unlocking operation of vehicle doors with the portable device 2 held for getting in the vehicle C which stops with a stopped engine. The in-vehicle device 1 recognizes the unlocking operation of vehicle doors by the request switch 15 and executes the vehicle cabin inside/outside determining process illustrated in a flow chart of FIGS. 12A and 12B. Then, the control part 11 specifies a failure of the transmitting antenna 31 in Step S101 (S101). If it is determined that the authentication is successful based on the exchange of signals between the in-vehicle device 11 and the portable device 2 held by the user (S107: Yes), the control part 11, in Step S108, selects Type 2=(2, 3, 4) (FIG. 11B) not including the first transmitting antenna 31. The control part 11 transmits a measurement command signal including a notification specifying the transmitting antennas 32 to 34 corresponding to the selected Type 2 (S109). In the portable device 2, the control part 21 identifies that the second to fourth transmitting antennas 32 to 34 are used based on the notification included in the measurement command signal (S208) and transmits a measurement result signal including a received signal strength in the form a received signal strength vector in which a measurement result of the received signal strength from the first transmitting antenna 31 is set to "0" as a component, for example, such as $\chi=(0, \chi_2, \chi_3, \chi_4)$ (S213). The control part 11 of the in-vehicle device 1, in order from the first area 61, reads the first statistical values and the second statistical values, for each area, corresponding to the selected Type 2 (S113), calculates statistical distances (S114), and compares the statistical distance between the measurement result and the first statistical values and the statistical distance between the measurement result and the second statistical values, thereby determining the inside or the outside of each of the area (S115).

In this case, the vehicle doors are not unlocked, and the user is located outside the vehicle, and accordingly, the portable device 2 is determined to be located outside the area of the first area 61 (S115: No), and then the vehicle cabin inside/outside determining process is terminated. An expected value corresponding to the vehicle cabin inside/outside of the portable device 2 according to the control of a case where an unlocking operation is performed from the outside of the vehicle door is "0" (outside of the vehicle cabin), and the expected value and the result of the vehicle cabin inside/outside determination match each other, and accordingly, the in-vehicle device 1 unlocks the doors. Therefore, the user can open the door, enter the inside of the cabin, and sit on the driver's seat.

As described above, even in a case where a failure occurs in any one of the transmitting antennas 31 to 34, the in-vehicle device 1 detects the failure and can continue to perform the vehicle cabin inside/outside determination with high accuracy by selecting appropriate antennas from among the remaining antennas.

In addition, as illustrated in Embodiment 1, for each combination (type) of antennas selected in a case where an antenna failure occurs, the statistical values that are a mean vector and an inverse covariance matrix are acquired through calculation and are stored in advance. Therefore statistical values do not need to be acquired at the time of performing the vehicle cabin inside/outside determining process, and the number of processes for the calculation can be decreased.

In Embodiment 1, while the transmitting antennas 31 to 34 of the in-vehicle device 1 side and the receiving tri-axial antenna 23a of the portable device 2 side are configured to correspond to the LF band or the VLF band, and the receiving antenna 4 of the in-vehicle device 1 side and the transmitting antenna 22a of the portable device 2 side are configured to correspond the UHF, the used frequency bands are not limited to such frequency bands. In addition, it is apparent that the number of the transmitting antennas 31, 32, 33 and 34 is not limited to four. Furthermore, it is apparent that the positions of the transmitting antennas 31 to 34 and the position of the receiving antenna 4 are not limited to the positions described above.

In the in-vehicle device 1 according to Embodiment 1, the statistical values characterizing the inside and the outside of each of four different areas including the first area 61 to the fourth area 64 are configured to be stored in the storage part 14. However, it is apparent that the number of areas is not limited to four. For example, also in case of two areas including the first area 61 and the second area 62, the determination of the inside or the outside of a boundary of a door of the driver's seat side or a boundary of a door of the front passenger seat side can be performed precisely.

In addition, it is configured that the storage part 14 of the in-vehicle device 1 according to Embodiment 1 stores a mean vector and an inverse covariance matrix as statistical values, the mean vector is based on received signal strengths that are actually measured for each area by using the portable device 2 or a model measuring device. However, the storage part 14 may store a determination equation used for determining the inside or the outside of each area instead of the statistical values. The determination equation, for example, is an approximated equation of a curve representing a set of received signal strengths for which a Mahalanobis distance between a sample value group characterizing the inside of the first area 61 and a sample value group characterizing the outside of the first area 61 that is measured in advance is the same. By comparing a function value acquired by applying one received signal strength among measured received signal strengths to the approximated equation and the remaining received signal strengths respectively, the inside/outside determination can be performed.

Embodiment 2

A storage part 14 according to Embodiment 2 additionally stores priority level information relating to a type of a combination of transmitting antennas 31 to 34 that is used with priority when any one or more of the antennas are failure. The hardware configuration of a vehicle communication system in Embodiment 2 is similar to that of the system in Embodiment 1. Thus, like configurations are designated by like numerals and their detailed description is not given.

FIG. 14 is an explanatory diagram illustrating an example of the priority level information stored in the storage part 14 according to Embodiment 2. The storage part 14, as illustrated in FIG. 14, stores antenna numbers (identifier) of antennas included in a combination of antennas and priority level information of each combination are stored, for each identification number (identification information) of a combination of antennas. The priority level, for example, as illustrated in FIG. 14, is set to be high in order of Type 2, Type 3, Type 1, Type 4, Type 5 and Type 6.

The selection of antennas according to the priority levels illustrated in FIG. 14 will be described. In Embodiment 2, while an in-vehicle device 1 executes a process similar to the processing procedure of the flow chart of FIGS. 12A and 12B described in Embodiment 1, details of an antenna selecting process performed in Step S108 are different from those of Embodiment 1, and thus, a detailed processing content will be described below.

If it is determined that the authentication is successful (S107: Yes), a control part 11 of the in-vehicle device 1 selects antennas of a combination that does not include an antenna that has failed but has a highest priority level among combinations of transmitting antennas 31 to 34 stored in the storage part 14 (S108).

Description will be presented based on the specific example of priority levels illustrated in FIG. 14. For example, in a case where the first transmitting antenna 31 whose antenna number is "1" has failed, the control part 11, in Step S108, selects the transmitting antennas 32 to 34 of Type 2 having a higher priority level out of Type 2 and Type 4 not including the transmitting antenna 31 specified as an antenna that has failed. In a case where the second transmitting antenna 32 whose antenna number is "2" has failed, the control part 11 selects the transmitting antennas 31, 33 and 34 of Type 3 having a higher priority level out of Type 3 and Type 4 not including the transmitting antenna 32 specified as an antenna that has failed. Similarly, in a case where the third transmitting antenna 33 whose antenna number is "3" has failed, the control part 11 selects the transmitting antennas 31 and 32 of Type 1 having a higher priority level out of Type 1 and Type 6 not including the transmitting antenna 33 specified as an antenna that has failed. In a case where the fourth transmitting antenna 34 whose antenna number is "4" has failed, the control part 11 selects the transmitting antennas 31 and 32 of Type 1 having a higher priority level out of Type 1 and Type 5 not including the transmitting antenna 34 specified as an antenna that has failed.

In this way, by storing priority level information in association with the combinations of the transmitting antennas 31 to 34, in a case where an antenna that has failed is present, the priority level information can be used as references at the time of selecting antennas for a determination of high accuracy as possibly as can.

Embodiment 3

A storage part 14 according to Embodiment 3 stores priority level information relating to one of combinations of the transmitting antennas 31 to 34 that is to be used with priority when any one or more of the antennas are failure, for each of a first area 61 to a third area 63 that are determination targets. For each of the areas that are the determination targets, the influence on the determination accuracy is different depending on the use of received signal from which one of the transmitting antennas 31 to 34.

FIG. 15 is an explanatory diagram illustrating an example of the priority level information stored in the storage part 14 according to Embodiment 3. The storage part 14, as illustrated in FIG. 15, stores information of a combination of transmitting antennas 31 to 34 to be used with priority, for each of boundary surfaces that are determination targets. For example, in order to determine precisely the inside or the outside of a first area 61 that has a boundary surface of a right wall of a vehicle C as a determination target, it is preferable to use multiple antennas having a large difference between the received signal strengths, in other words, to use more antennas disposed at different distances toward the left side of the vehicle C. Accordingly, as a combination of antennas used for determining the inside or the outside of the first area 61, Type 2 using the transmitting antennas 32 to 34 has a highest priority level, thereafter, a same priority level is set to Types 1, 5 and 6, and thereafter, priority levels are set in order of Type 3 and Type 4. Similarly, in order to determine the inside or the outside of a second area 62 that has a boundary surface of the left wall of the vehicle C as a determination target with high accuracy, Type 3 including a largest number of antennas disposed at different distances toward the right side of vehicle C has a highest priority level, thereafter, a same priority level is set to Types 1, 5 and 6, and thereafter, the priority levels are set in order of Type 2 and Type 4. In order to determine the inside or the outside of a third area 63 that has a boundary surface of the rear face of the vehicle C as a determination target with high accuracy, the priority levels are set such that Type 5 including the antenna 33 disposed at the rear part of the vehicle C has a highest priority level, thereafter, the priority level of Type 4 is high, subsequently, a same priority level is set to Types 2, 3 and 6, and, finally, Type 1 has a lowest priority level.

Figure 16A:
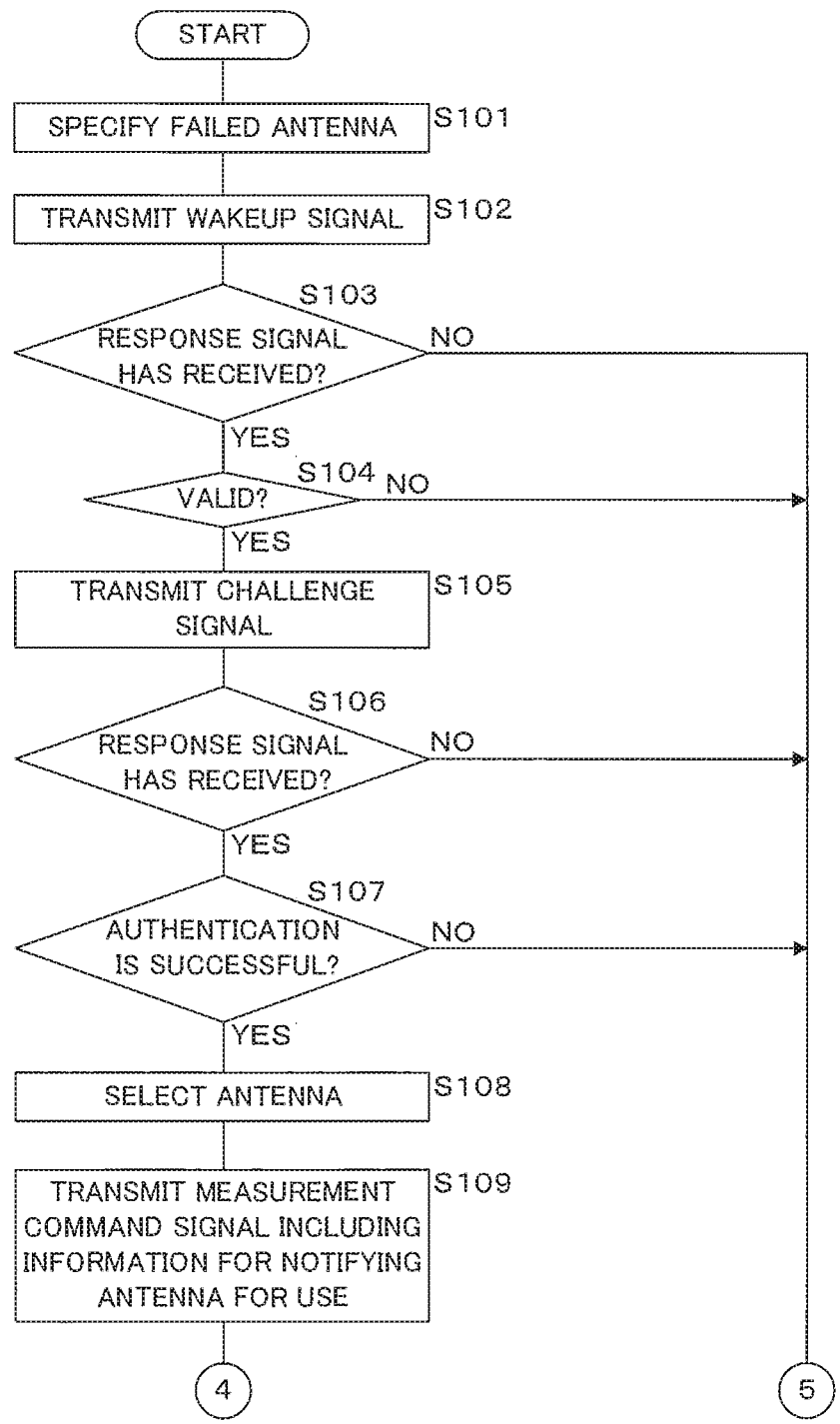
FIG. 16A is a flow chart illustrating an example of a processing procedure of a vehicle cabin inside/outside determination executed by an in-vehicle device according to Embodiment 3.
Figure 16B:
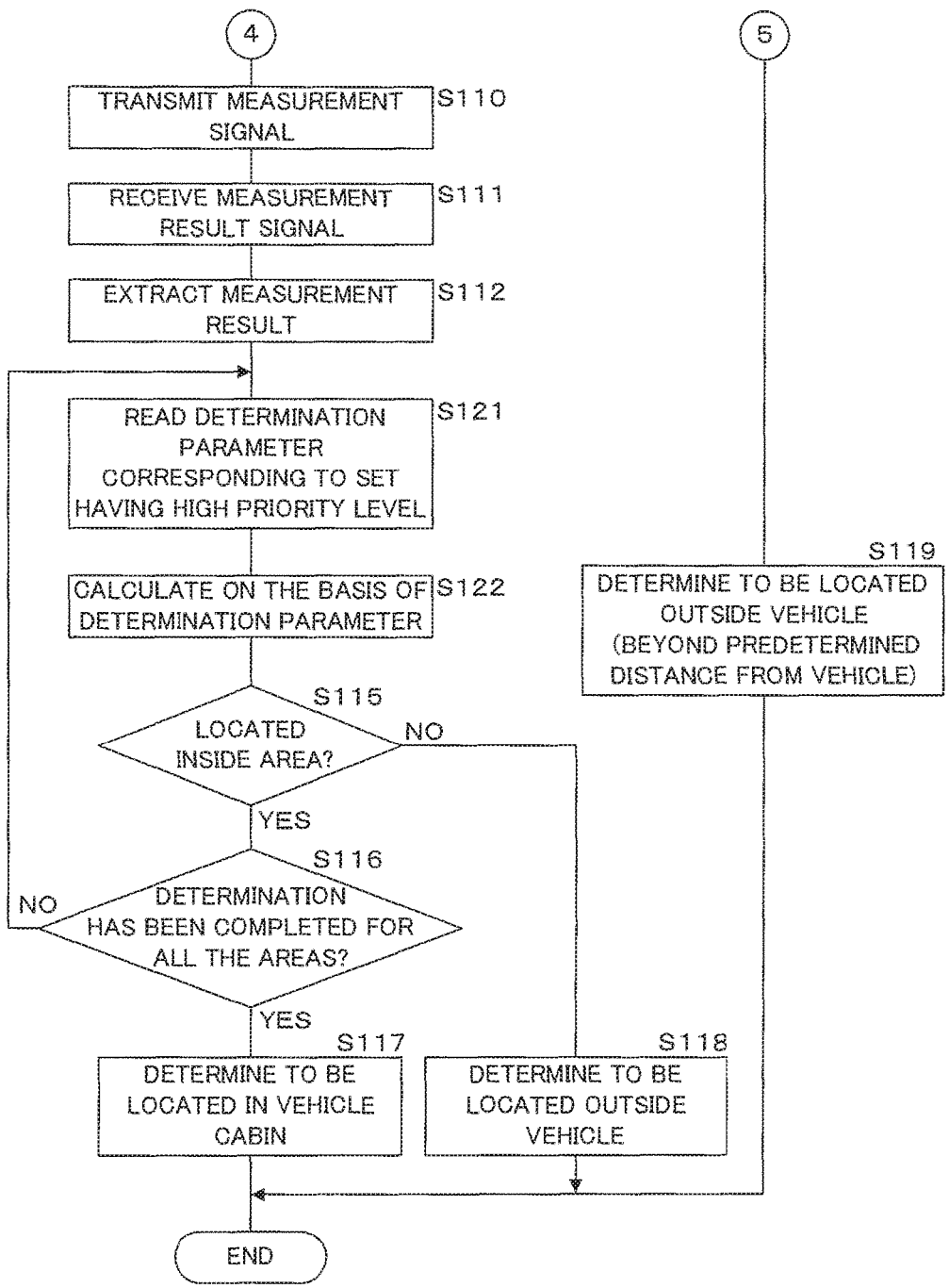
FIG. 16B is a flow chart illustrating an example of a processing procedure of a vehicle cabin inside/outside determination executed by an in-vehicle device according to Embodiment 3.

A vehicle cabin inside/outside determination performed based on the priority levels illustrated in FIG. 15 will be described. FIGS. 16A and 16B are flow charts illustrating an example of a processing procedure of the vehicle cabin inside/outside determination executed by the in-vehicle device 1 according to Embodiment 3. In the processing procedure illustrated in the flow charts of FIGS. 16A and 16B, a same step number is assigned to a process common to the processing procedure illustrated in the flow chart of FIGS. 12A and 12B according to Embodiment 1, and detailed description thereof is not given.

A control part 11 of the in-vehicle device 1, in Step S108, selects all the remaining antennas other than an antenna specified as an antenna that has failed (S108). The reason for this is that, as will be described later, in Embodiment 3, for each determination target area, a combination of transmitting antennas 31 to 34 of transmission sources relating to used received signal strengths may be different, and the received signal strengths of all the remaining antennas are measured. The control part 11 transmits a measurement command signal including a notification specifying the selected antennas (S109). The control part 11 sequentially transmits measurement signals from the remaining antennas (S110) and extracts a measurement result acquired by the portable device 2 from the received measurement result signal (S111 and S112).

Next, the control part 11, for each determination target area, reads a determination parameter corresponding to a combination not including an antenna specified as an antenna that has failed among combinations of antennas of a type having a high priority level from the storage part 14 (Step S121). The storage part 14, as described in Embodiment 1, for each of the first area 61 to the fourth area 64, stores a first statistical values and a second statistical values formed by components corresponding to antennas used for each type or a determination equation used for determining the inside or the outside of each area, which are calculated in advance, as a determination parameter.

The control part 11 performs statistical calculation based on the read determination parameter with the received signal strength corresponding to the determination target area from a measurement result extracted from the measurement result signal (Step S122) and determines the inside/outside of the area based on a result of the calculation (S115).

In Step S122, for example, in a case where Mahalanobis distances are compared with each other, the control part 11 receives a measurement result signal including a measurement result in the form of a received signal strength vector in which a measurement result of the received signal strength from an antenna (for example, the transmitting antenna 31) that is not used is set to zero such as $\chi=(0, \chi_2, \chi_3, \chi_4)$ from the portable device 2. So that the control part 11 calculates a received signal strength vector formed by components corresponding to a combination of antennas of a type having a high priority level. For example, in a case where the transmitting antenna 31 has failed, and the combination of Type 4 using the transmitting antennas 33 and 34 is selected, in Step S122, the control part 11 calculates $\chi=(0, 0, \chi_3, \chi_4)$ or $\chi=(\chi_3, \chi_4)$ from a received signal strength vector of $\chi=(0, \chi_2, \chi_3, \chi_4)$ supplied from the portable device 2 and uses them or the like.

In addition, in Step 122, in a case where a determination equation is used, among components in the form of a received signal strength vector such as $\chi=(0, \chi_2, \chi_3, \chi_4)$ supplied from the portable device 2, a received signal strength corresponding to a combination of antennas of a type having a high priority level is selected, and a function value according to a determination equation using the selected received signal strength is acquired through calculation or the like.

A process represented in a flow chart of FIGS. 16A and 16B will be described using a specific example based on the example of the priority levels illustrated in FIG. 15. In a case where the first transmitting antenna 31 has failed, the control part 11, in Step S108, selects the remaining transmitting antennas 32 to 34 not including the transmitting antenna 31 specified as the antenna that has failed. Then, the control part 11, in Step S121, in a case where the first area 61 is set as a determination target area, refers to the priority levels illustrated in FIG. 15, which are stored in the storage part 14, of the first area 61. The control part 11 refers to the types in order of highest to lowest priority level, and reads a determination parameter (for example, a first statistical values and a second statistical values) stored in association with Type 2, since Type 2 having a highest priority level does not include the first transmitting antenna 31 that is an antenna having failed. If it is determined that the inside of the first area 61 is determined (S115: Yes), the control part 11 refers to the types in order of highest to lowest priority level for the second area 62. Since Type 3 having the highest priority level includes the transmitting antenna 31 that is an antenna having failed, the control part 11 refers to Types 1, 5 and 6 having a next highest priority level, however, all of them include the transmitting antenna 31 that is the antenna having failed, the control part 11 reads a determination parameter associated with Type 2 having a next highest priority level (fifth) that does not include the transmitting antenna 31 (S121). Similarly, for the third area 63, Type 5 having the highest priority level includes the transmitting antenna 31 that is the antenna having failed, and accordingly, the control part 11 refers to Type 4 having a next highest priority level. Since Type 4 does not include the transmitting antenna 31, the control part 11 reads a determination parameter associated with Type 4 (S121) and determines the inside or the outside of the third area 63. FIG. 17 is an explanatory diagram illustrating a type selected for each area in a case where the first transmitting antenna 31 has failed. As illustrated in FIG. 17, in a case where the first transmitting antenna 31 has failed, for the first area 61 and the second area 62, a determination based on the determination parameter associated with Type 2 is performed, and, for the third area 63, a determination based on the determination parameter associated with Type 4 is performed.

This similarly applies to a case where the second transmitting antenna 32 has failed. FIG. 18 is an explanatory diagram illustrating a type selected for each area in a case where the second transmitting antenna 32 has failed. In Step S121, for the first area 61, the control part 11 reads a determination parameter associated with Type 3 not including the transmitting antenna 32 that has failed but having a high (fifth) priority level (S121). For the second area 62, the control part 11 reads a determination parameter associated with Type 3 not including the transmitting antenna 32 that has failed but having a highest (first) priority level (S121). For the third area 63, the control part 11 reads a determination parameter associated with Type 4 not including the transmitting antenna 32 that has failed but having a highest (second) priority level (S121). As illustrated in FIG. 18, in a case where the second transmitting antenna 32 has failed, for the first area 61 and the second area 62, a determination based on the determination parameter associated with Type 3 is performed, and, for the third area 63, a determination based on the determination parameter associated with Type 4 is performed.

This similarly applies to a case where the third transmitting antenna 33 has failed. FIG. 19 is an explanatory diagram illustrating a type selected for each area in a case where the third transmitting antenna 33 has failed. In Step S121, for the first area 61, the control part 11 reads a determination parameter associated with Type 1 having a smaller number that is identification information out of Types 1 and 6 not including the transmitting antenna 33 that has failed but having a high (second) priority level (S121). For the second area 62, the control part 11 reads a determination parameter associated with Type 1 having a smaller number that is identification information out of Types 1 and 6 not including the transmitting antenna 33 that has failed but having a high (second) priority level (S121). For the third area 63, the control part 11 reads a determination parameter associated with Type 6 not including the transmitting antenna 33 that has failed but having a high (third) priority level (S121). As illustrated in FIG. 19, in a case where the third transmitting antenna 33 has failed, for the first area 61 and the second area 62, a determination based on the determination parameter associated with Type 1 is performed, and, for the third area 63, a determination based on the determination parameter associated with Type 6 is performed.

This similarly applies to a case where the fourth transmitting antenna 34 has failed. FIG. 20 is an explanatory diagram illustrating a type selected for each area in a case where the third transmitting antenna 33 has failed. In Step S121, for the first area 61, the control part 11 reads a determination parameter associated with Type 1 having a smaller number that is identification information out of Types 1 and 5 not including the transmitting antenna 34 that has failed but having a high (second) priority level (S121). For the second area 62, the control part 11 reads a determination parameter associated with Type 1 having a smaller number that is identification information out of Types 1 and 5 not including the transmitting antenna 34 that has failed but having a high (second) priority level (S121). For the third area 63, the control part 11 reads a determination parameter associated with Type 5 not including the transmitting antenna 34 that has failed but having a high (first) priority level (S121). As illustrated in FIG. 20, in a case where the fourth transmitting antenna 34 has failed, for the first area 61 and the second area 62, a determination based on the statistical values associated with Type 1 is performed, and, for the third area 63, a determination based on the statistical values associated with Type 5 is performed.

In this way, according to the third embodiment, for a plurality of combinations of antennas for use, a different priority level is associated with each of a plurality of areas that are determination targets. Accordingly, a determination can be performed with high accuracy by selecting a received signal strength that is different for each area among received signal strengths supplied from the remaining antennas other than an antenna that has failed.

In addition, also in a case where any antenna that has failed is not present, it may be configured such that the process illustrated in the flow chart of FIGS. 16A and 16B of Embodiment 3 is performed, and, for each area of determination target areas, a determination is performed by selecting the information of a received signal strength to be used based on priority levels.

Embodiment 4

In Embodiments 1 to 3, the vehicle cabin inside/outside determination is configured to be performed on the in-vehicle device 1. In contrast to this, according to Embodiment 4, the vehicle cabin inside/outside determination is performed on the portable device 2 which measures and calculates received signal strengths. The hardware configuration of a vehicle communication system in Embodiment 4 is similar to that of the system in Embodiment 1. Thus, like configurations are designated by like numerals and their detailed description is not given.

Figure 21:
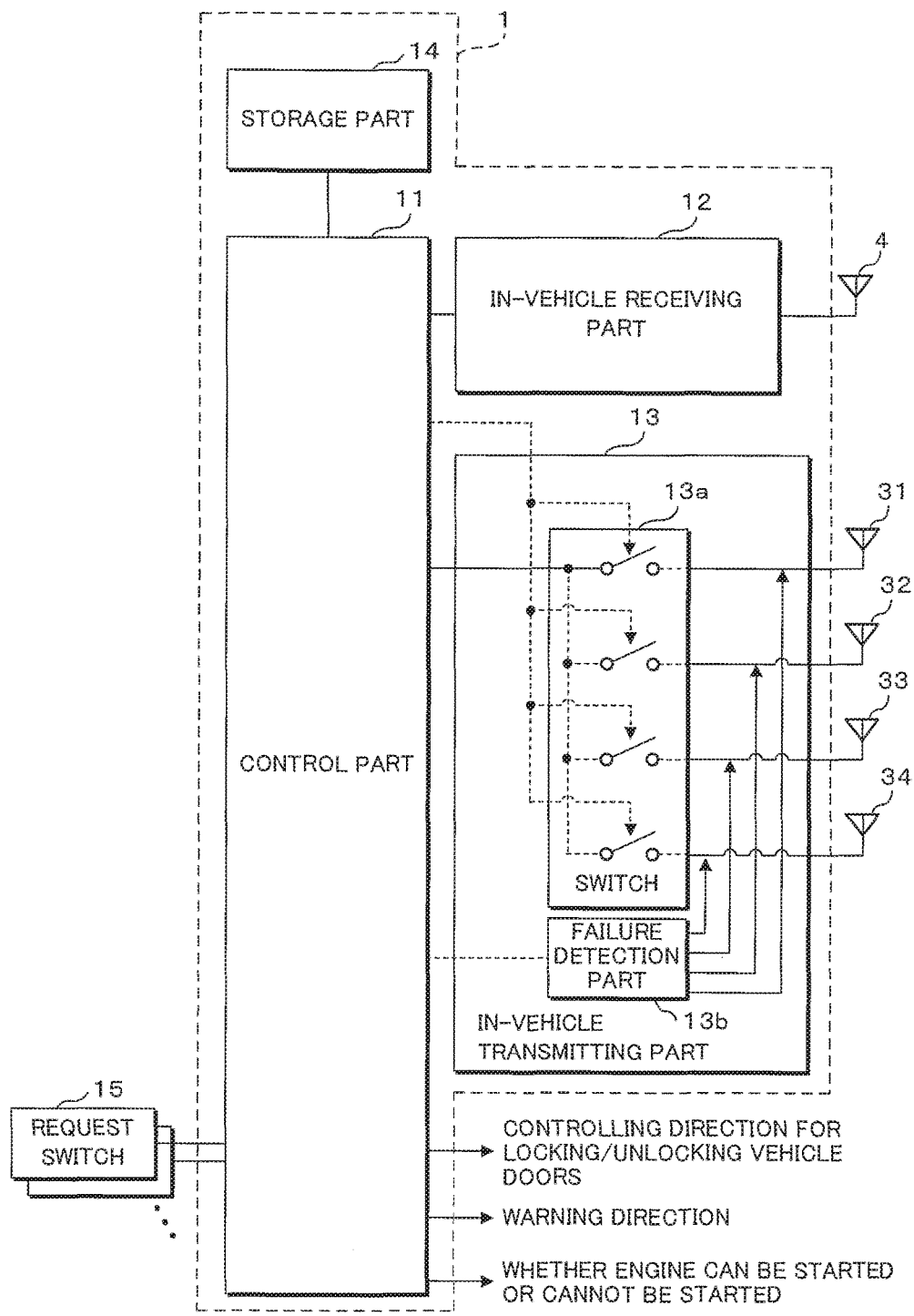
FIG. 21 is a block diagram illustrating a configuration of an in-vehicle device according to Embodiment 4.

FIG. 21 is a block diagram that illustrating a configuration of an in-vehicle device 1 according to Embodiment 4. Compared to Embodiment 1, a storage part 14 of the in-vehicle device 1 according to Embodiment 2 does not store the computer program 1P relating to the vehicle cabin inside/outside determination and the statistical values used for the vehicle cabin inside/outside determination. The storage part 14 stores a vehicle identifier of an own vehicle C and a portable device identifier used for identifying an authorized portable device 2 for the vehicle C or not.

In the in-vehicle device 1 according to Embodiment 4, a control part 11 recognizes the operation state of each switch from the request switches 15 and recognizes the open/closed state of vehicle doors by using a courtesy switch. The control part 11 performs locking/unlocking of vehicle doors, outputting an indication whether or not the engine or the driving battery system can be started, a process of outputting a warning to a user as necessary, and the like based on the recognized operation state, the open/closed state, and a determination result of a vehicle cabin inside/outside determination received from the portable device 2.

Figure 22:
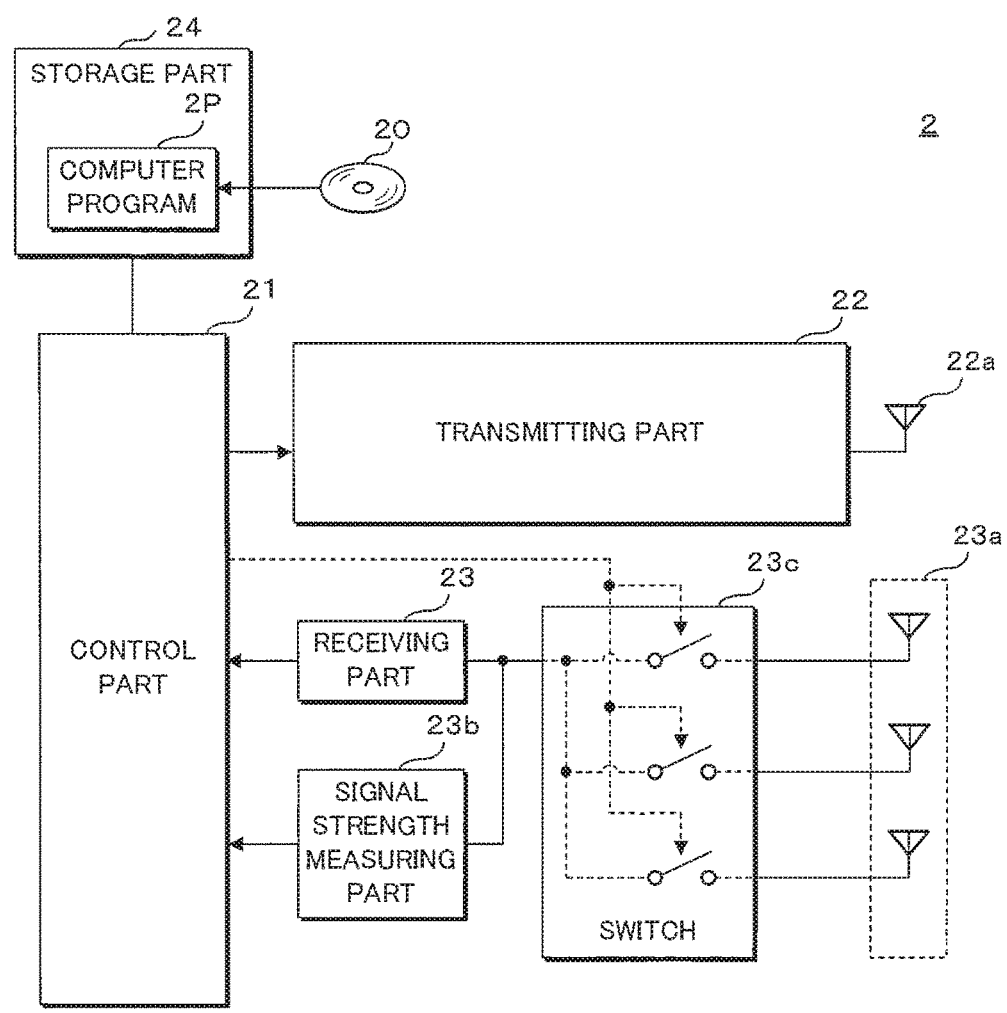
FIG. 22 is a block diagram illustrating a configuration of a portable device according to Embodiment 4.

FIG. 22 is a block diagram that illustrating a configuration of the portable device 2 according to Embodiment 4. Compared to Embodiment 2, the storage part 24 of the portable device 2 according to Embodiment 4 stores a computer program 2P that realizes a vehicle cabin inside/outside determination for the portable device 2 itself and a function for selecting a determination system relating to the vehicle cabin inside/outside determination by the control part 21 controlling the operation of each component of the portable device 2. In addition, the storage part 24 stores statistical values for each area used for the vehicle cabin inside or outside determination and for each type of combinations of antennas for use. Detailed statistical values are similar to those according to Embodiment 1, and detailed description thereof is not given.

The computer program 2P stored in the storage part 24 may be stored on an optical disc such as a CD-ROM, a DVD-ROM, or a BD or a magnetic disk such as a flexible disk or a hard disk, or may be read from a recording medium 20 such as a magneto-optical disk or a semiconductor memory and stored by another external computer not illustrated in the drawing or be downloaded through a communication network and stored by an external computer.

The control part 21 of the portable device 2 according to Embodiment 4 calculates received signal strengths through a vector operation related to the three axial directions based on a received signal strength of each radio signal measured by a signal strength measuring part 23b and also performs a vehicle cabin inside/outside determination based on the calculated received signal strengths.

Figure 23:
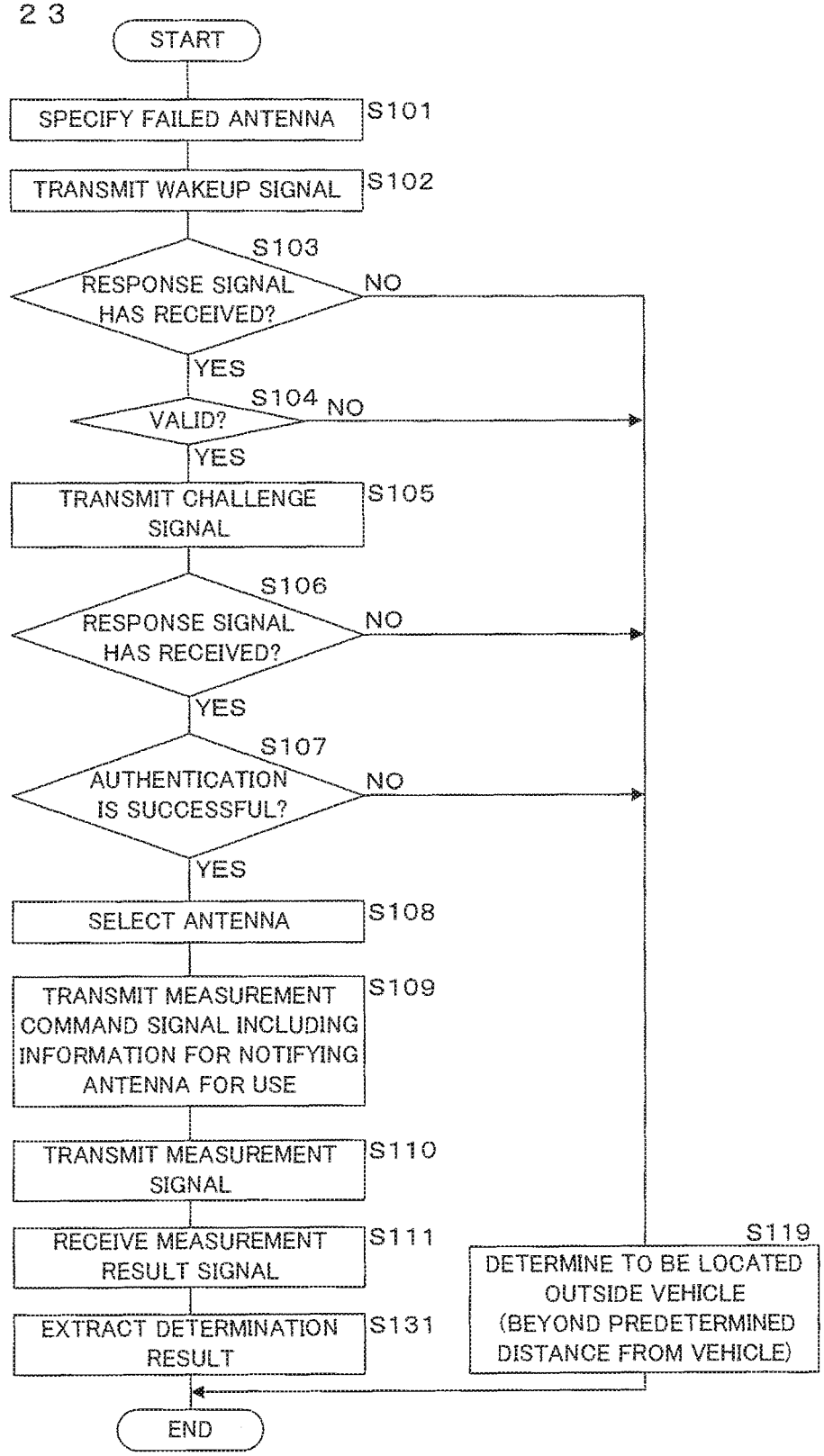
FIG. 23 is a flow chart illustrating an example of a processing procedure executed by an in-vehicle device according to Embodiment 4.

According to Embodiment 4, intermittently or when a vehicle cabin inside/outside determination is necessary for various control processes, the in-vehicle device 1 performs a process of obtaining a result of the vehicle cabin inside/outside determination from the portable device 2 as below. FIG. 23 is a flow chart illustrating an example of the processing procedure executed by the in-vehicle device 1 according to Embodiment 4. In the processing procedure represented below in the flow chart of FIG. 23, a same step number is assigned to a process common to the processing procedure represented in the flow chart of FIGS. 12A and 12B according to Embodiment 1, and detailed description thereof is not given.

The control part 11 of the in-vehicle device 1 according to Embodiment 4 sequentially selects antennas selected in Step S108 among the transmitting antennas 31 to 34 by using a switch 13a, transmits measurement signals from the selected antennas (S110), and receives a measurement result signal including a result of a determination executed by the portable device 2 by using a receiving antenna 4 (S111). The control part 11 extracts a determination result included in the received measurement result signal (Step S131) and terminates the vehicle cabin inside/outside determining process.

Figure 24:
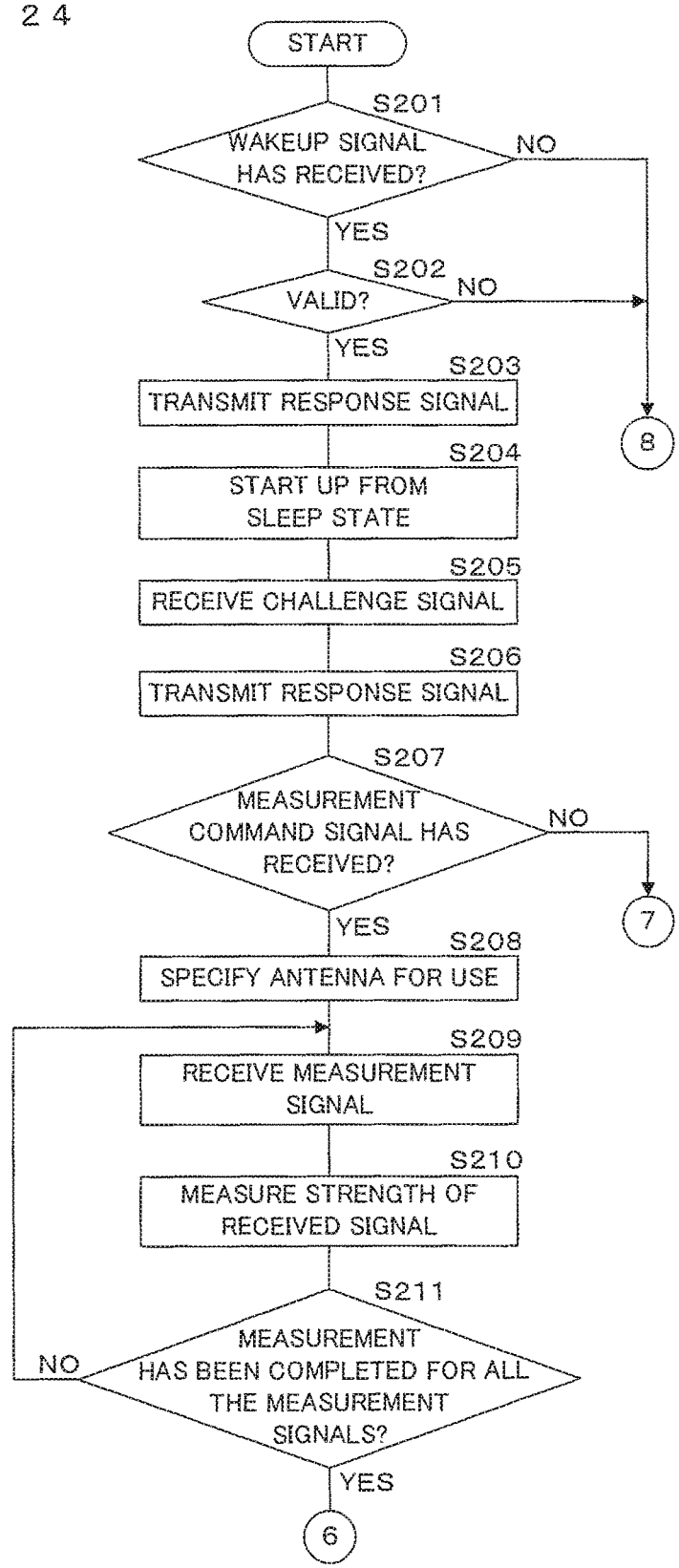
FIG. 24 is a flow chart illustrating an example of the processing procedure relating to a vehicle cabin inside/outside determination executed by a portable device according to Embodiment 4.
Figure 25:
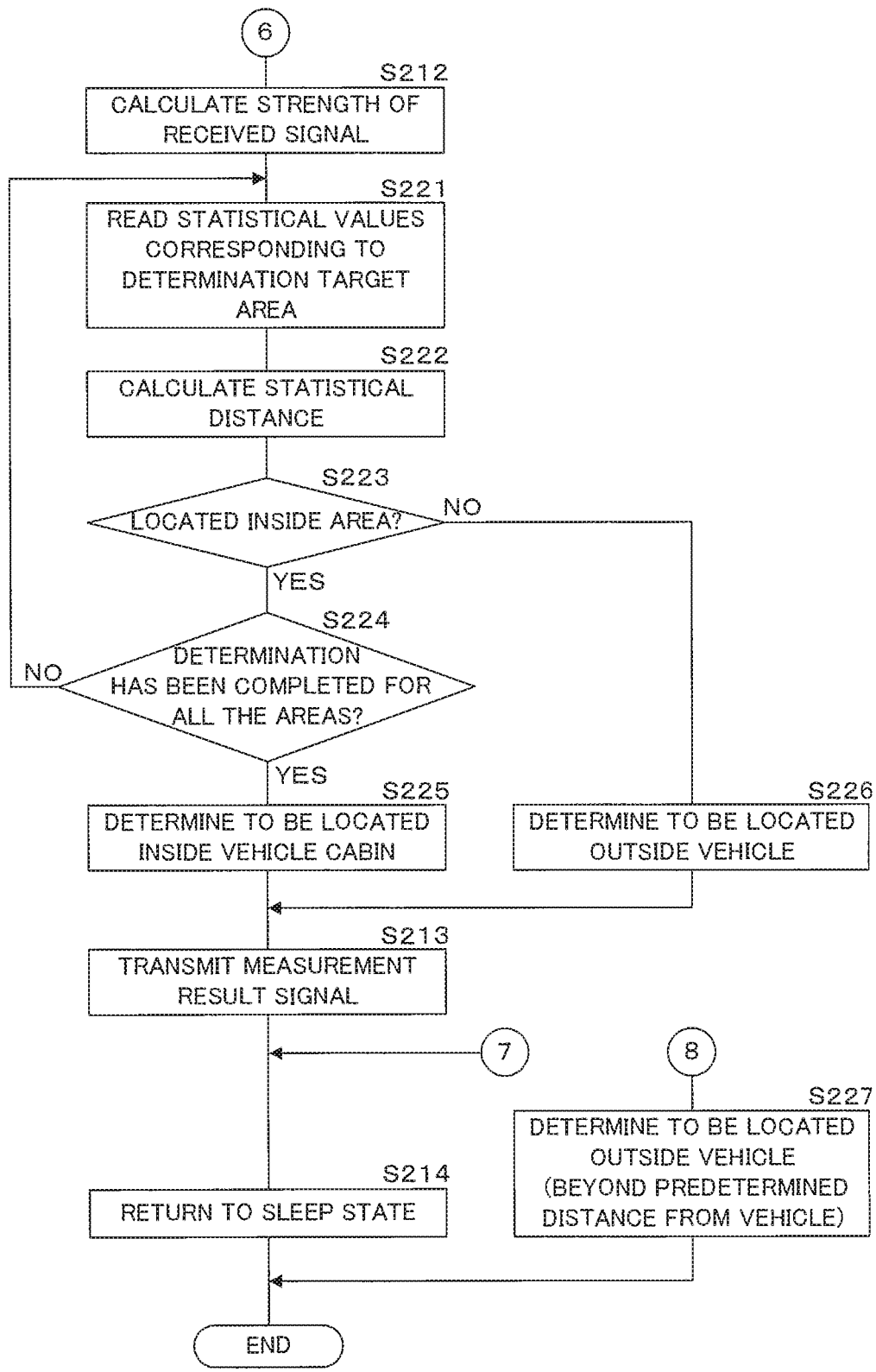
FIG. 25 is a flow chart illustrating an example of the processing procedure relating to the vehicle cabin inside/outside determination executed by a portable device according to Embodiment 4.

FIGS. 24 and 25 represent a flow chart illustrating an example of the processing procedure relating to the vehicle cabin inside/outside determination executed by the portable device 2 according to Embodiment 4. The processing procedure illustrated in the flow chart of FIGS. 24 and 25 corresponds to the processing procedure on the side of the in-vehicle device 1 illustrated in the flow chart of FIG. 23. In the processing procedure illustrated in the flow chart of FIGS. 24 and 25, a same step number is assigned to a process common to the processing procedure illustrated in the flow chart of FIGS. 13A and 13B according to Embodiment 1, and detailed description thereof is not given.

If it is determined that the measurement is completed for all the measurement signals transmitted from the in-vehicle device 1 side (S211: Yes), the control part 21 of the portable device 2 calculates a received signal strength based on received signal strength components of measured three radio signals through a vector operation for each measurement signal (S212) and reads statistical values of a type of a combination of antennas for use specified in Step S208 from the storage part 14 for each of a plurality of areas that are determination targets (Step S221).

The control part 21 calculates statistical distances for each of the inside and the outside based on the received signal strength acquired through the measurement and the read statistical values (Step S222). The control part 21, for each of the areas that are the determination targets, determines whether or not the portable device 2 is located inside the area (Step S223). In more details, in Step S222, the control part 21 calculates a Mahalanobis distance between a received signal strength vector of the measurement result and the first statistical values of the selected type, and a Mahalanobis distance between a received signal strength vector of the measurement result and the second statistical values of the selected type by using Equations (5) and (6) described above. Then, in Step S223, the control part 21 compares the calculated results with each other and determines that the portable device 2 itself is located inside the area that is the determination target, if it is determined that the received signal strength vector is closer the first statistical values in terms of statistical distance, that is the Mahalanobis distance, rather than the second statistical values.

If it is determined that the portable device 2 is located inside the area in Step S223 (S223: Yes), the control part 21 determines whether or not the determination has been completed for all the areas (Step S224). In Step S224, if the antennas for use specified in Step S208 are all the antennas, and an antenna that has failed is not present, all the four areas are the determination target areas. On the other hand, in a case where an antenna that has failed is present, and the antennas for use specified in Step S208 are a part of the antennas, three areas including the first area 61 to the third area 63 are all the determination target areas. If it is determined that the determination has not been completed for all the areas in Step S224 (S224: No), the control part 21 returns the process to Step S221.

If it is determined that the determination has been completed for all the areas (S224: Yes), the portable device 2 is determined to be located inside all the areas, and accordingly, the control part 21 determines that the portable device 2 is located inside the vehicle cabin of the vehicle C (Step S225). The control part 21 transmits a measurement result signal including a determination result from the transmitting antenna 22a (S213), is returned to the sleep state (S214), and terminates the procedure.

If it is determined that the portable device 2 is located outside at least any one area of a plurality of the areas in Step S223 (S223: No), the control part 21 determines that the portable device 2 is located outside the vehicle cabin of the vehicle C (Step S226), transmits a measurement result signal including the determination result (S213), is returned to the sleep state (S214), and terminates the procedure.

If it is determined that a wakeup signal has been received in Step S201 (S201: No) or in or if it is determined the in-vehicle device 1 is invalid in Step S202 (S202: No), the control part 21 determines that the portable device 2 is located outside the cabin (beyond a predetermined distance from the vehicle C) (Step S227) and then terminates the procedure.

As described above, also in a case where the portable device 2 is configured to perform the vehicle cabin inside/outside determination, if any one or more of the transmitting antennas 31 to 34 has failed, a result detected by the in-vehicle device 1 is recognized by the portable device 2, whereby the vehicle cabin inside/outside determination having high accuracy using the remaining antennas can be continued.

Also in Embodiment 4, as illustrated in Embodiment 2 or 3, it may be configured such that the storage part 24 of the portable device 2 stores priority levels of types combining the transmitting antennas 31 to 34 in different patterns, and the control part 21 of the portable device 2 selects the types in order of highest to lowest priority level in Step S221 described above. In such a case, also in a case where the portable device 2 is configured to perform the vehicle cabin inside/outside determination, the received signal strength can be selected such that the determination is performed with high accuracy as possibly as can, or a different received signal strength can be selected for each area.

It should be understood that the present embodiment disclosed above is illustrative and not restrictive. The scope is defined by the appended claims rather than by the description preceding them, and all changes that fall within metes and bounds of the claims, or equivalence of such metes and bounds thereof are therefore intended to be embraced by the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:
1. A vehicle communication system comprising:
an in-vehicle device transmitting and receiving signals by using a plurality of antennas disposed at different positions of a vehicle; and
a portable device receiving signals transmitted from one or more of the plurality of antennas and transmitting signals in response to the received signals, wherein the in-vehicle device comprises:
a storage part storing information representing a plurality of different combinations of the antennas among the plurality of antenna, and statistical values, for each of a plurality of areas commonly including a vehicle cabin inner space of the vehicle, based on the received signal strength of signals transmitted from a part of the plurality of antennas measured in advance at multiple positions inside and outside each of the plurality of areas and for each of the plurality of combinations;
a failure detection part detecting an antenna having a failure among the plurality of antennas;
a selection part selecting antennas for use corresponding to a combination among the plurality of different combinations of the antennas, the combination including any of a remaining antennas of the plurality of antennas except for the antenna having a failure;
a reading part reading, for each of the plurality of areas, statistical values of one of the combinations corresponding to the selected antennas from the statistical values stored in the storage part for each of the different combinations of antennas;
an area determining part determining whether the portable device is located inside or outside of an area, for each of the plurality of areas, by calculating and comparing statistical distances for each of the inside and the outside of the area between the statistical values read by the reading part and the received signal strengths measured by the portable device, the signal being transmitted from the antennas selected by the selection part; and
a determination part determining whether the portable device is located inside or outside the vehicle based on a determination result by the area determining part, and determines that the potable device is located inside the vehicle cabin if the area determining part determines that the portable device is located inside all areas.

2. The vehicle communication system according to claim 1, wherein the storage part stores priority level information in association with each of the different combinations of antennas, and the reading part reads statistical values of one of the different combinations in association with priority level information having a higher priority stored in the storage part.

3. The vehicle communication system according to claim 2, wherein the storage part stores priority level information different for each of the plurality of areas, for each of the different combinations.

4. An in-vehicle device comprising:
a transmitting part transmitting a signal to another device by using a plurality of antennas disposed at different positions of a vehicle;
a receiving part receiving a signal from said another device;
a storage part storing information representing a plurality of different combinations of the antennas among the plurality of antennas and statistical values for each of a plurality of area commonly including a vehicle cabin inner space of the vehicle based on a received signal strength of signals transmitted from a part of the plurality of antennas, the strengths being measured in advance at multiple positions inside and outside each of the plurality of areas and for each of the plurality of combinations;
a failure detection part detecting an antenna having a failure among the plurality of antennas;
a selection part selecting antennas for use corresponding to a combination among a plurality of different combinations of the antennas, the combination including any of a remaining antennas of the plurality of antennas except for the antenna having a failure;
a reading part reading, for each of the plurality of areas, statistical values of one of the combinations corresponding to the selected antennas from the statistical values stored in the storage part for each of the different combinations of antennas; and
an area determining part determining whether said another device is located inside or outside of an area, for each of the plurality of areas, by calculating and comparing statistical distances for each of the inside and the outside of the area between the statistical values read by the reading part and the received signal strengths measured by said another device, the signal being transmitted from the antennas selected by the selection part; and
a determination part determining whether said another device is located inside or outside the vehicle based on a determination result by the area determining part, and determines that said another device is located inside the vehicle cabin if the area determining part determines that said another device is located inside all areas.

5. A portable device comprising:
a receiving part receiving a signal transmitted from a plurality of antennas disposed at different positions of a vehicle;
a transmitting part transmitting a signal in response to the received signals;
a storage part storing information representing a plurality of different combinations of the antennas among the plurality of antennas, and statistical values for each of a plurality of areas commonly including a vehicle cabin inner space of the vehicle, based on a received signal strength of signals transmitted from the plurality of antennas, the strengths being measured in advance at multiple positions inside and outside each of the plurality of areas and for each of the plurality of combinations;
a notification receiving part receiving a notification of antennas for use corresponding to a combination among a plurality of different combinations of the antennas, the combination including any of a remaining antennas of the plurality of antennas except for the antenna having a failure;
a reading part reading, for each of the plurality of areas, statistical values for each of the inside and the outside, from the statistical values stored in the storage part for each of the different combinations of antennas, relating to received signal strengths of signals transmitted from the antennas for use identified by the notification;
a measurement part measuring the received signal strengths of the signals transmitted from the antennas for use; and
an area determining part determining whether the portable device is located inside or outside of an area, for each of the plurality of areas, by calculating and comparing statistical distances for each of the inside and the outside of the area between the statistical values read by the reading part and the received signal strengths measured by the measurement part, the signal being transmitted from the antennas for use identified by the notification; and
a determination part determining whether the portable device is located inside or outside the vehicle based on a determination result by the area determining part, and determines that the portable device is located inside the vehicle cabin if the area determining part determines that the portable device is located inside all areas.

6. A non-transitory computer readable medium storing a computer program causing a computer including: a transmitting part transmitting signal to another device by using a plurality of antennas on different positions of a vehicle; receiving part receiving signal from said another device; and a storage part storing information representing a plurality of different combinations of the antennas among the plurality of antennas and statistical values for each of a plurality of areas commonly including a vehicle cabin inner space of the vehicle based on received signal strengths of signals transmitted from a part of the plurality of antennas measured in advance at multiple positions inside and outside each of the plurality of areas and for each of the plurality of combinations, to determine whether said another device is located inside or outside the vehicle, and the computer program causing the computer to function as:
- a failure detection part detecting an antenna having a failure among the plurality of antennas;
- a selection part selecting antennas for use corresponding to a combination among a plurality of different combinations of the antennas, the combination including any of a remaining antennas of the plurality of antennas except for the antenna having a failure;
- a reading part reading, for each of the plurality of areas, statistical values of one of the combinations corresponding to the selected antennas from the statistical values stored in the storage part for each of the different combinations of antennas;
- an area determining part determining whether said another device is located inside or outside of an area, for each of the plurality of areas, by calculating and comparing statistical distances for each of the inside and the outside of the area between the statistical values read by the reading part and the received signal strengths measured by said another device, the signal being transmitted from the antennas selected by the selection part; and
- a determination part determining whether said another device is located inside or outside the vehicle based on a determination result by the area determining part, and determines that said another device is located inside the vehicle cabin if the area determining part determines that said another device is located inside all areas.

7. A non-transitory computer readable medium storing a computer program causing a computer including: a transmitting part transmitting a radio signal to another device disposed in a vehicle; receiving part receiving radio signal from said another device; a measurement part measuring a received signal strength; and a storage part storing information representing a plurality of different combinations of the antennas among the plurality of antennas and statistical values for each of a plurality of areas commonly including a vehicle cabin inner space of the vehicle, based on received signal strength of signals transmitted from a part of a plurality of antennas, the strengths being measured in advance at multiple positions inside and outside each of the plurality of areas and for each of the plurality of combinations, to determine whether the computer itself is located inside or outside the vehicle, and the computer program causing the computer to function as:
- a notification receiving part receiving a notification of antennas for use corresponding to a combination among a plurality of different combinations of the antennas, the combination including any of a remaining antennas of the plurality of antennas except for the antenna having a failure;
- a reading part reading, for each of the plurality of areas, statistical values for each of the inside and the outside from the statistical values stored in the storage part for each of the different combinations of antennas, relating to received signal strengths of signals transmitted from the antennas for use identified by the notification;
- an area determining part determining whether the computer itself is located inside or outside of an area, for each of the plurality of areas, by calculating and comparing statistical distances for each of the inside and the outside of the area between the statistical values read by the reading part and the received signal strengths measured by the measuring part, the signal being transmitted from the antennas for use identified by the notification; and
- a determination part determining whether the computer itself is located inside or outside the vehicle based on a determination result by the area determining part, and determines that the computer itself is located inside the vehicle cabin if the area determining part determines that the computer itself is located inside all areas.

* * * * *